(12) United States Patent
Hazeyama et al.

(10) Patent No.: US 8,936,343 B2
(45) Date of Patent: Jan. 20, 2015

(54) CONTROL DEVICE AND IMAGE FORMING SYSTEM

(71) Applicant: Brother Kogyo Kabushiki Kaisha, Nagoya-shi, Aichi-ken (JP)

(72) Inventors: Tomoaki Hazeyama, Yokkaichi (JP); Kenichi Iesaki, Ichinomiya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/012,438

(22) Filed: Aug. 28, 2013

(65) Prior Publication Data

US 2014/0063112 A1    Mar. 6, 2014

(30) Foreign Application Priority Data

Aug. 31, 2012 (JP) ................................. 2012-191973

(51) Int. Cl.
| | | |
|---|---|---|
| *B41J 29/393* | (2006.01) | |
| *B41J 19/00* | (2006.01) | |
| *B41J 19/20* | (2006.01) | |
| *B41J 19/14* | (2006.01) | |
| *G05B 19/4061* | (2006.01) | |
| *B41J 2/045* | (2006.01) | |

(52) U.S. Cl.
CPC .............. *B41J 19/202* (2013.01); *B41J 19/005* (2013.01); *G05B 2219/37624* (2013.01); *B41J 19/14* (2013.01); *G05B 19/4061* (2013.01); *G05B 2219/42288* (2013.01); *B41J 2/04503* (2013.01); *B41J 19/205* (2013.01)
USPC .............................................. 347/19; 347/37

(58) Field of Classification Search
CPC ..... B41J 2/04503; B41J 19/202; B41J 19/205

USPC ....................................................... 347/19, 37
See application file for complete search history.

(56) References Cited

U.S. PATENT DOCUMENTS

| | | | |
|---|---|---|---|
| 5,249,161 A * | 9/1993 | Jones et al. ...................... 367/83 |
| 5,304,906 A | 4/1994 | Arita et al. | |
| 5,418,440 A * | 5/1995 | Sakaguchi et al. ............ 318/560 |
| 5,440,213 A | 8/1995 | Arita et al. | |
| 7,102,311 B2 * | 9/2006 | Nishimura et al. ........... 318/280 |
| 8,141,978 B2 * | 3/2012 | Miyazawa ...................... 347/19 |

FOREIGN PATENT DOCUMENTS

| | | |
|---|---|---|
| JP | H03-196313 A | 8/1991 |
| JP | H06-284764 A | 10/1994 |
| JP | 2000-052286 A | 2/2000 |

(Continued)

*Primary Examiner* — Julian Huffman
(74) *Attorney, Agent, or Firm* — Merchant & Gould PC

(57) ABSTRACT

There is provided a control device configured to control a drive system including a motor and a driven object. The control device includes a controller configured to compute an operation amount, to measure a control amount of the controlled object, to input a measurement signal of the control amount to an inverse model of a model indicating input-output characteristics of the controlled object, and to generate a differential signal between an output of the inverse model and the operation amount; and a filter configured to filter the generated differential signal, and which has frequency characteristics of attenuating a vibrational component which is developed due to mechanical characteristics of the controlled object, from the differential signal. The controller is configured to make a judgment of whether or not a defect has occurred in the controlled object, based on an output of the filter.

21 Claims, 13 Drawing Sheets

(56) References Cited

FOREIGN PATENT DOCUMENTS

| | | |
|---|---|---|
| JP | 2005-100145 A | 4/2005 |
| JP | 2007-283561 A | 11/2007 |
| JP | 2010-184443 A | 8/2010 |
| JP | 2012-060830 A | 3/2012 |

* cited by examiner

CONTROL DEVICE AND IMAGE FORMING SYSTEM

CROSS REFERENCE TO RELATED APPLICATION

The present application claims priority from Japanese Patent Application No. 2012-191973, filed on Aug. 31, 2012, the disclosure of which is incorporated herein by reference in its entirety.

BACKGROUND OF THE INVENTION

1. Field of the Invention

The present invention relates to a control device which is configured to control a movement of a driven object, and an image forming system which includes the control device.

2. Description of the Related Art

As a control device which is configured to control a movement of a driven object, a control device having a protection function which suppresses a damage from a collision when the driven object collided with a surrounding object, has hitherto been known.

Concretely, a control device which is configured to control a rotational velocity of a motor has hitherto been known. In such control device, a disturbance torque is estimated by a disturbance observer from a torque-current command and the rotational velocity of the motor. As the disturbance torque which has been estimated exceeds a disturbance torque value which has been set in advance, it is presumed that the driven object collided with a surrounding object, and the motor is controlled to be stopped. Moreover, as a technology related to the disturbance observer, a technology in which a high-frequency component is eliminated by filtering an output of the disturbance observer by a low-pass filter has been known.

SUMMARY OF THE INVENTION

Incidentally, it is preferable that a defect of a driven object or a driven target due to a contact with a surrounding object can be detected promptly and highly accurately. For instance, in a printer apparatus, there are cases in which, jamming of a paper by making a contact with a recording unit occurs at the time of transporting of the recording unit. When detection of such defect is delayed, a recovery action is troublesome.

The present teaching has been made in view of the abovementioned circumstances, and an object of the present teaching is to provide a favorable technology for detecting a defect of the object controlled by using an output of the disturbance observer.

According to a first aspect of the present teaching, there is provided a control device configured to control a drive system including a motor and a driven object which is driven by the motor, as a controlled object, including:

a controller configured to compute an operation amount which is to be input to the controlled object, to measure a control amount of the controlled object, to input a measurement signal of the control amount to an inverse model of a model indicating input-output characteristics of the controlled object, and to generate a differential signal between an output of the inverse model and the operation amount which is input to the controlled object; and a filter which is configured to filter the generated differential signal, and which has frequency characteristics of attenuating a vibrational component which is developed due to mechanical characteristics of the controlled object, from the differential signal, wherein the controller is configured to make a judgment of whether or not a defect has occurred in the controlled object, based on an output of the filter.

For the control device of the present teaching, the frequency characteristics of the filter which filters the differential signal are to be determined to enable attenuation of the vibrational component that is developed due to the mechanical characteristics of the controlled object. According to the present teaching, the filter being arranged to have such frequency characteristics, the vibrational component which is developed due to the mechanical characteristics of the controlled object, or in other words, a vibrational component which is developed due to a difference between an inverse model of the controlled object in a disturbance observer and the actual mechanical characteristics of the controlled object, appears in an output of the disturbance observer, and it is possible to suppress the vibrational component from imparting an adverse effect to an operation of judging by the controller.

Therefore, according to the present teaching, it is possible to arrange the control unit to be capable of judging a defect of the controlled object highly accurately, and to provide a control unit which is suitable for detecting a defect of the controlled object. To add a remark, according to the present teaching, by arranging the filter to have the abovementioned frequency characteristics, it is possible to arrange the control device which is capable of detecting a defect of the controlled object promptly while suppressing a misjudgment. For instance, when frequency characteristics which enable to attenuate the vibrational component developed due to the mechanical characteristics of the controlled object, and with a small time delay are adopted as the frequency characteristics of the filter, it is possible to form a control device capable of judging a defect of the controlled object promptly and highly accurately.

According to a second aspect of the present teaching, there is provided a control device configured to control a drive system including a motor and a driven object which is driven by the motor, as a controlled object, including:

a controller which is configured to compute an operation amount which is to be input to the controlled object, to measure a control amount of the controlled object, to input a measurement signal of the control amount which has been measured, to an inverse model of a model indicating input-output characteristics of the controlled object, and to generate a differential signal between an output of the inverse model and the operation amount which is input to the controlled object; and a first low-pass filter and a second low-pass filter which are configured to attenuate a high-frequency component of the differential signal that has been generated by the controller, wherein the controller, based on an output of the first low-pass filter, makes a judgment of whether or not a defect has occurred in the controlled object, and based on an output of the second low-pass filter, the controller corrects the operation amount which has been computed, and inputs an operation amount after the correction, to the controlled object, and a cut-off frequency of the first low-pass filter is lower than a cut-off frequency of the second low-pass filter.

For the second low-pass filter of which an output is to be used for a movement control of the driven object, it is preferable that a vibrational component corresponding to the mechanical characteristics of the controlled object is included, as such arrangement enables to carry out correction assuming the difference between the practical input-output characteristics of the controlled object and the inverse model as a disturbance. On the other hand, for the first low-pass filter of which, an output is to be used for judging a defect, when a vibrational component corresponding to the mechanical characteristics of the controlled object is included in the output, an accuracy of judging a defect is degraded.

Therefore, when the cut-off frequency of the first low-pass filter and the cut-off frequency of the second low-pass filter are set such that the cut-off frequency of the first low-pass filter is lower than the cut-off frequency of the second low-pass filter, it is possible to set an appropriate cut-off frequency according to the application, in each of the first low-pass filter and the second low-pass filter. Moreover, it is possible to make a highly accurate judgment of a defect, based on the output of the first low-pass filter, while suppressing an effect of disturbance, based on the output of the second low-pass filter.

Moreover, by the movement control of the controlled object using the motor, it is possible to indicate the input-output characteristics of the controlled object by a rigid model, and it is possible to make an arrangement such that the controller computes an operation amount (an electric-current command value etc.) for the motor as the operation amount. Moreover, in a case of controlling a velocity of the driven object, it is possible to make an arrangement such that the controller measures the velocity of the driven body as the control amount.

Moreover, according to a third aspect of the present teaching, there is provided an image forming system configured to form an image on a sheet that is transported, including:

a recording-unit transporting mechanism which includes a recording unit configured to form an image on the sheet, and a motor configured to drive the recording unit, and which is configured to be displaced with respect to the sheet by being driven by the motor; and a control device which is configured to control the recording-unit transporting mechanism as a controlled object, wherein the control device includes a controller which is configured to compute an operation amount of the motor, to measure a physical amount indicating a state of movement of the recording unit, as a control amount corresponding to the operation amount, to input a measurement signal of the physical amount that has been measured, to an inverse model which is a model indicating input-output characteristics of the controlled object, and to generate a differential signal between an output of the inverse model and the operation amount which is input to the motor, and a filter which is configured to filter the differential signal generated by the controller, and which has frequency characteristics of attenuating a vibrational component which is developed due to mechanical characteristics of the controlled object, from the differential signal, and the controller is configured to make a judgment of whether or not the recording unit has made a contact with the sheet, based on an output of the filter.

According to the image forming system of the present teaching, it is possible to a make a highly accurate judgment of whether or not the recording unit has made a contact with the sheet, by suppressing an effect of the vibrational component that is developed due to the mechanical characteristics of the recording-unit transporting mechanism. Therefore, it is possible to provide a superior image forming system to consumers.

According to a fourth aspect of the present invention, there is provided an image forming system configured to form an image on a sheet that is transported, including:

a recording-unit transporting mechanism which includes a recording unit configured to form an image on the sheet, and a motor configured to drive the recording unit, and the recording unit is displaced with respect to the sheet by being driven by the motor; and a control device which is configured to control the recording-unit transporting mechanism as a controlled object, wherein the control device includes a controller which is arranged to compute an operation amount which is to be input to the controlled object, to measure a physical amount indicating a state of movement of the recording unit, as a control amount corresponding to the operation amount, to input a measurement signal of the physical amount which has been measured, to an inverse model which is a model indicating input-output characteristics of the controlled object, and to generate a differential signal between an output of the inverse model and the operation amount which is input to the motor, and a first low-pass filter and a second low-pass filter which are configured to attenuate a high-frequency component of the differential signal that has been generated, and the controller, based on an output of the first low-pass filter, is configured to make a judgment of whether or not the recording unit has made a contact with the sheet, and the controller, based on an output of the second low-pass filter, is configured to correct the operation amount which has been computed, and inputs an operation amount after the correction, to the motor, and a cut-off frequency of the first low-pas filter is lower than a cut-off frequency of the second low-pass filter.

According to such image forming system, it is possible to set a suitable cut-off frequency in accordance with the application, in the first low-pass filter and the second low-pass filter. Moreover, it is possible to make a highly accurate judgment of a defect, based on the output of the first low-pass filter, while suppressing an effect of disturbance, based on the output of the second low-pass filter.

DETAILED DESCRIPTION OF THE PREFERRED EMBODIMENTS

Figure 1:
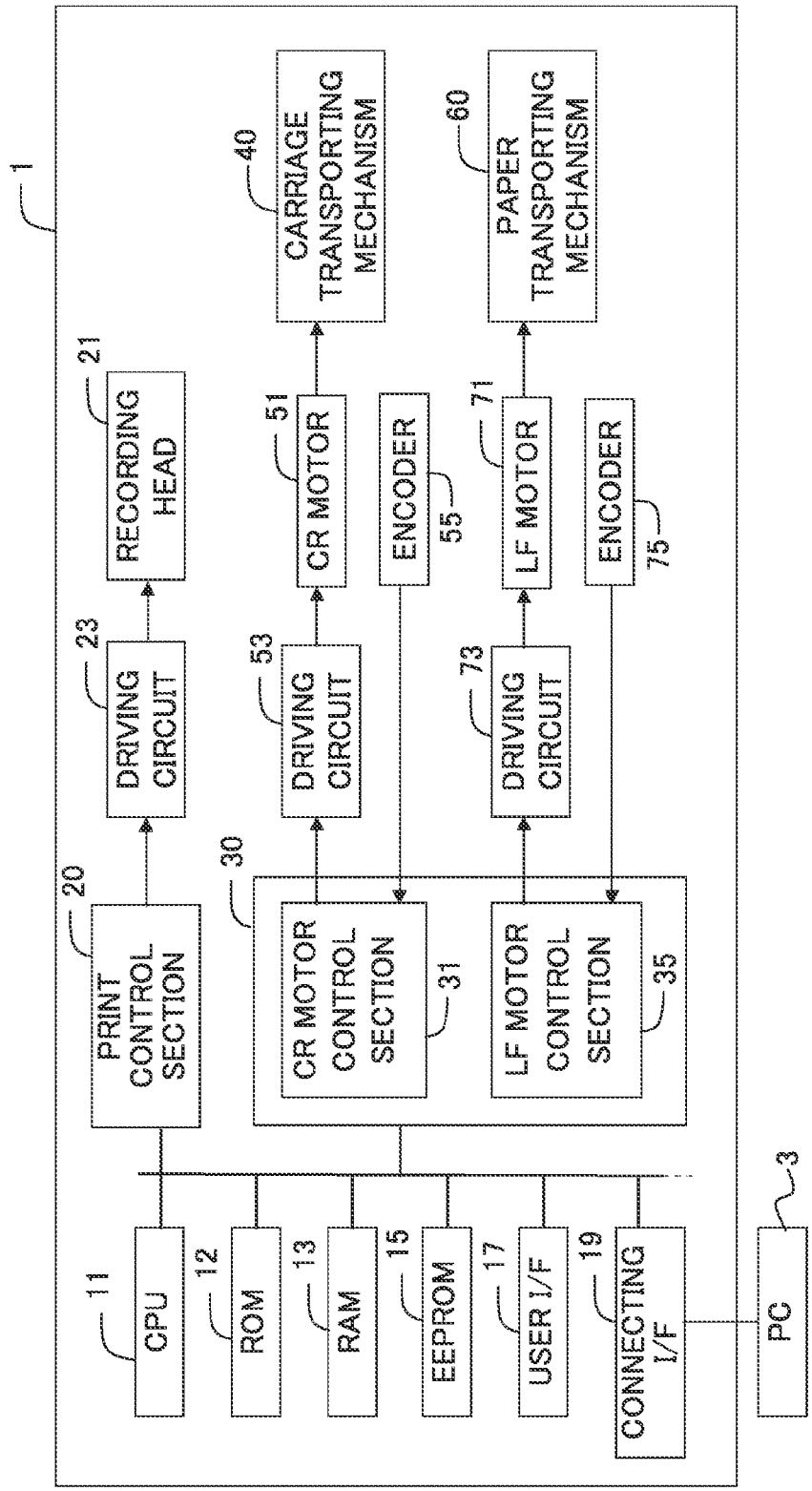
FIG. 1 is a block diagram indicating a configuration of a printer apparatus 1.

An exemplary embodiment of the present teaching will be described below by referring to the accompanying diagrams.

A printer apparatus 1 of the embodiment is a printer apparatus having a jamming detection function, and is an apparatus which is formed as a so-called ink jet printer which is configured to form an image on a paper Q by an ink jet method. The printer apparatus 1 includes a CPU 11, an ROM 12, a RAM 13, an EEPROM 15, a user interface 17, a connecting interface 19, a print control section 20, and a motor control section 30.

Furthermore, the printer apparatus 1 includes a recording head 21 and a driving circuit 23 as a mechanism configured to form an image on the paper Q, a carriage transporting mechanism 40, a CR motor (an abbreviation of a carriage motor) 51, and a driving circuit 53 as a mechanism configured to transport the recording head 21 in a main scanning direction, and a paper transporting mechanism 60, an LF motor 71, and a driving circuit 73 as a structure for transporting the paper Q in a secondary scanning direction which is orthogonal to the main scanning direction.

Moreover, the printer apparatus 1 includes an encoder 55 which is capable of measuring a position and a velocity of a carriage 41 on which the recording head 21 is mounted, and an encoder 75 which is capable of measuring an amount of transporting and a velocity of transporting of the paper Q.

To describe in detail, the CPU 11 realizes various functions by carrying out an integrated control of the printer apparatus 1 by executing processing according to a computer program which has been recorded in the ROM 12. The ROM 12 stores various computer programs, and the RAM 13 is to be used as a working memory at the time of executing processing by the CPU 11. The EEPROM 15 stores various setting information as a non-volatile memory of which data is rewritable electrically.

The user interface 17 includes a display configured to display various information for a user of the printer apparatus 1, and an operation device configured to receive various information from the user to the printer apparatus 1. The connecting interface 19 is an interface for connecting a personal computer 3 (hereinafter, referred to as a PC 3) and the printer apparatus 1, such as a USB interface, and is arranged to be capable of receiving a print command and data to be printed, from the PC 3.

As the CPU 11 receives a print command and data to be printed from the PC 3 via the connecting interface 19, the CPU 11 makes the print control section 20 execute a control of jetting ink droplets from the recording head 21 by inputting a command or instruction to the print control section 20 and the motor control section 30, and makes the motor control section 30 execute a control of transporting the carriage 41 and the paper Q by controlling the CR motor 51 and the LF motor 71. Accordingly, the CPU 11 forms an image on the paper Q, based on the data to be printed.

The recording head 21 is a known ink-jet head in which a plurality of nozzle rows for jetting ink droplets have been arranged. The recording head 21 is driven by the driving circuit 23, and jets the ink droplets on to an area on the paper Q facing a nozzle surface.

The print control section 20, based on the command from the CPU 11, inputs a control signal to the driving circuit 23 such that an image based on the data to be printed is formed on the paper Q, and by carrying out the abovementioned operation, realizes a control of jetting the ink droplets by the recording head 21.

Figure 2:
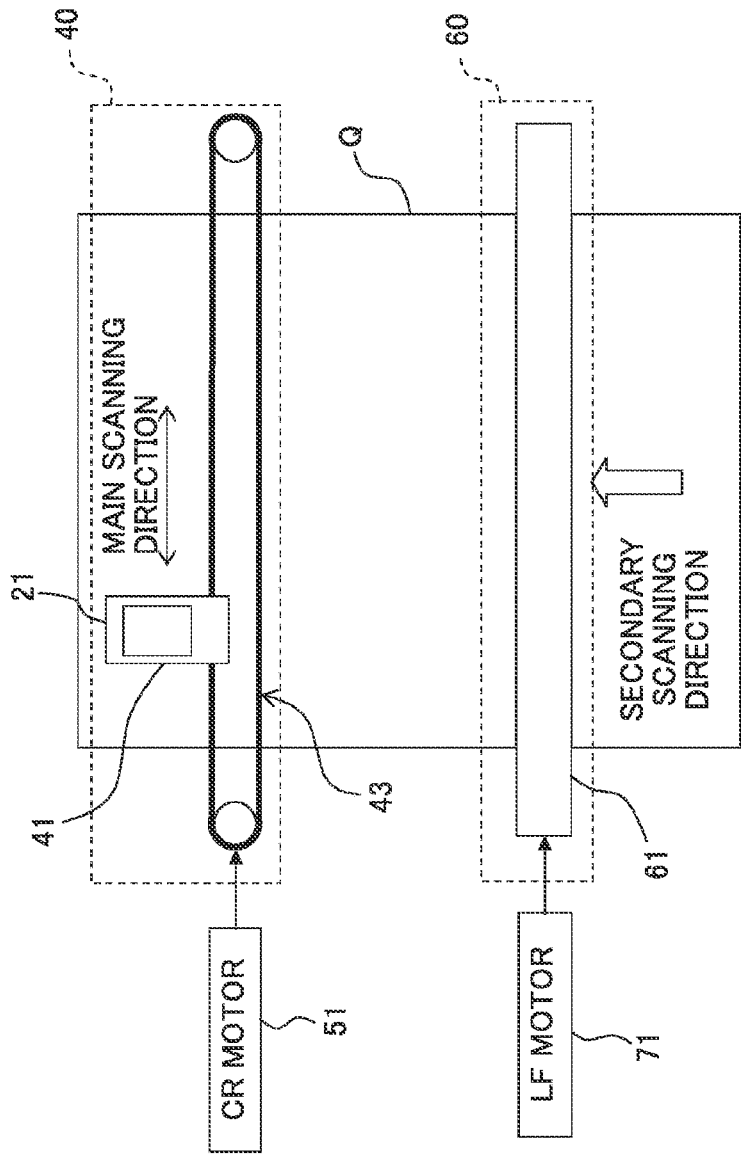
FIG. 2 is a schematic diagram related to a carriage transporting mechanism 40 and a paper transporting mechanism 60.
Figure 3:
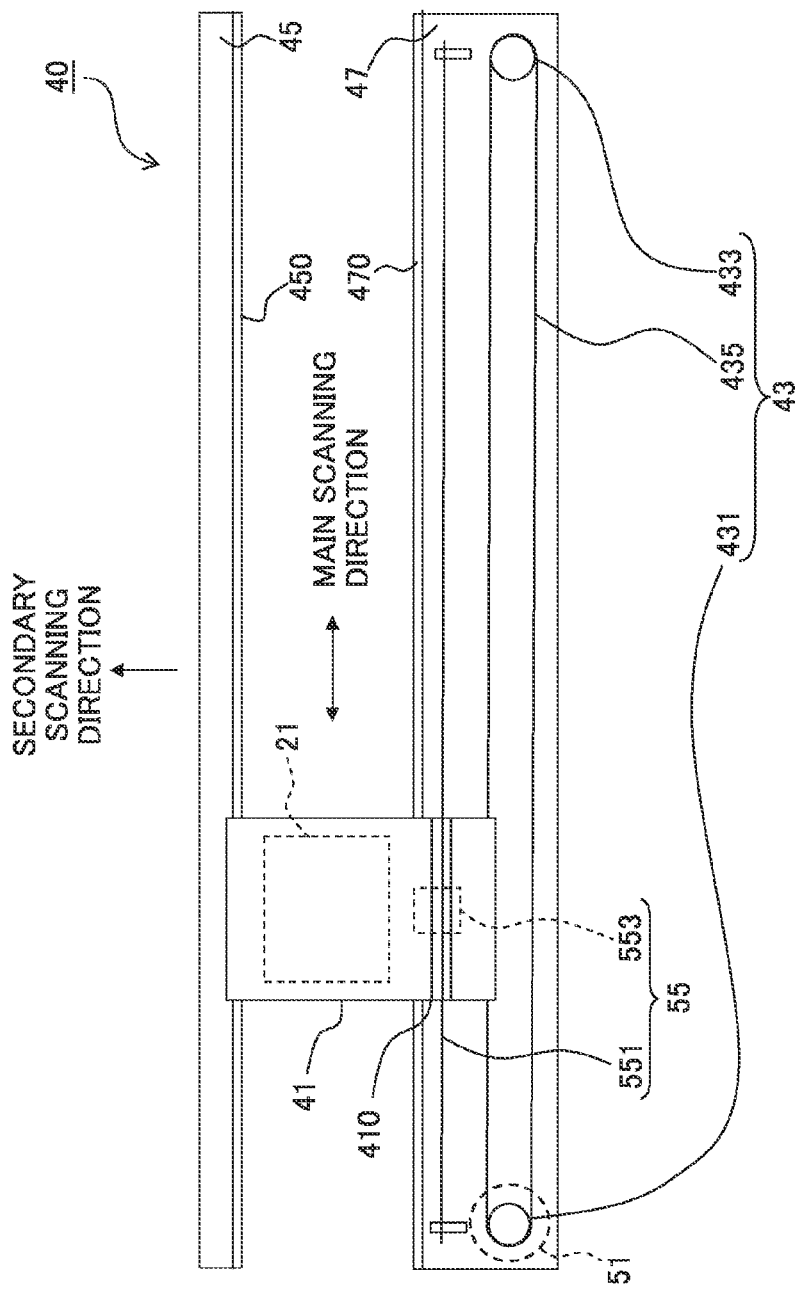
FIG. 3 is a top view showing a detailed structure of the carriage transporting mechanism 40.

On the other hand, the carriage transporting mechanism, as shown in FIG. 2, includes a belt mechanism 43 which is configured to rotate by being driven by the CR motor 51, so that the carriage 41 with the recording head 21 mounted thereon is transported in the main scanning direction by the belt mechanism 43. The carriage transporting mechanism 40, as shown in FIG. 3, includes the carriage 41, the belt mechanism 43, and guide rails 450 and 470.

The belt mechanism 43 includes a drive pulley 431 and a driven pulley 433 arranged in a line in the main scanning direction, and a belt 435 which is put around the drive pulley 431 and the driven pulley 433. In the belt mechanism 43, the drive pulley 431 rotates upon receiving a driving force from the CR motor 51, and the belt 435 and the driven pulley 433 are driven to rotate with the rotation of the drive pulley 431. The carriage 41 is fixed to the belt 435 which is configured to move in such manner.

Moreover, the guide rail 450 is provided to be extended along the main scanning direction, and is formed by a member 45 having an L-shaped cross-section with respect to a direction perpendicular to the main scanning direction. Moreover, the guide rail 470 is provided in parallel to the guide rail 450, at a position away from the guide rail 450 in the secondary scanning direction. A member 47 which forms the guide rail 470 is a member having an L-shaped cross-section with respect to a direction perpendicular to the main scanning direction, and is provided at an upstream in the secondary scanning direction of the member 45.

The belt mechanism 43 is installed in an area at an upstream of the secondary scanning direction from a portion of the member 47 forming the guide rail 470. Moreover, an encoder scale 551 forming a linear encoder is provided along the main scanning direction, in an area of the member 47 between the belt mechanism 43 and the guide rail 470.

A groove (not shown in the diagram) in the main scanning direction corresponding to a shape of the guide rails 450 and 470 is formed on a lower surface of the carriage 41, and a groove 410 in the main scanning direction corresponding to a shape of the encoder scale 551 is formed on an upper surface of the carriage 41. An optical sensor 553 which is capable of reading the encoder scale 551 is installed in the groove 410, and the recording head 21 is installed to be able to jet ink droplets on to the paper Q.

The carriage 41 is placed on the guide rails 450 and 470 such that the guide rails 450 and 470 are arranged in the groove (not shown) in the lower surface. As described above, the carriage 41 is mounted on the guide rails 450 and 470. Therefore, as the CR motor 51 rotates, the carriage 41, in conjunction with the turning of the belt 435, is guided on the guide rails 450 and 470, and moves in the main scanning direction. Moreover, the recording head 21 is transported in the main scanning direction with the movement of the carriage 41 in the main scanning direction.

The encoder 55 includes the optical sensor 553 and the encoder scale 551 arranged in the groove 410 of the carriage 41. The encoder 55 is formed by the optical sensor 553 and the encoder scale 551 as a linear encoder which is capable of measuring a position and a velocity of the carriage 41. The encoder 55, similarly as known encoders, reads optically, scale markings provided at equal intervals on the encoder scale 551.

When the carriage 41 moves in the main scanning direction, relative positions of the encoder scale 551 fixed to the member 47 and the optical sensor 553 moving together with the carriage 41 change. By using this feature, the encoder 55 reads the scale markings, such as slits, of the encoder scale 551 by the optical sensor 553, and outputs a pulse signal corresponding to a displacement of the carriage 41 in the main scanning direction, as an encoder signal. In the embodiment, the position and the velocity of the carriage 41 (indirectly, a position and a velocity of the recording head 21) in the main scanning direction is measured based on an output signal (encoder signal) of the encoder 55. Note that, the description has been made by citing an example of an optical encoder. However, the present teaching is not restricted to such an arrangement. The encoder 55 may be configured to measure the position and the velocity of the carriage 41, and may not be the optical encoder necessarily.

Moreover, the motor control section 30 (refer to FIG. 1) includes a CR motor control section 31 configured to carry out a control of transporting the carriage 41 in the main scanning direction by control of the CR motor 51. The CR motor control section 31 is configured to generate a pulse width modulation signal (hereinafter, referred to as a PWM signal) as an input signal to the driving circuit 53 in accordance with a command from the CPU 11, and controls the CR motor 51 which is a DC motor. At this time, the CR motor control section 31 controls the velocity of the carriage 41 by a feedback control based on the output signal of the encoder 55. Moreover, the driving circuit 53 drives the CR motor 51 by a driving current corresponding to the PWM signal which is input from the CR motor control section 31.

Moreover, the paper transporting mechanism 60, as shown in FIG. 2, includes at least one roller 61 having an axis parallel to the main scanning direction, which is driven by the LF motor 71, and rotates in the secondary scanning direction. The paper transporting mechanism 60 transports the paper Q supplied from a tray, in the secondary scanning direction by rotation of the roller 61, and sends the paper Q to a position of jetting of ink droplets by the recording head 21.

The motor control section 30 (refer to FIG. 1) includes an LF motor control section 35 configured to carry out a control of transporting the paper Q in the secondary scanning direction by a control of the LF motor 71. The LF motor control section 35, following a command from the CPU 11, generates the PWM signal as a signal to be input to the driving circuit 73, and controls the LF motor 71 which is a DC motor. At this time, the LF motor control section 35 carries out control of transporting the paper Q by a feedback control based on an output signal from the encoder 75 as a rotary encoder provided to the LF motor 71, the roller 61, or a transmission system between the LF motor 71 and the roller 61. Moreover, the driving circuit 73 drives the LF motor 71 according to the PWM signal which is input from the LF motor control section 35.

As the print command and the data to be printed are input to the CPU 11 in the printer apparatus 1 through the connecting interface 19, the CPU 11 operates the print control section 20 to make the recording head 21 carry out an operation of jetting ink droplets for forming an image on the paper Q based on the data to printed. Also, the CPU 11 operates the CR motor control section 31 to move the carriage 41 in the main scanning direction. Furthermore, every time the carriage 41 reaches a point of return in the main scanning direction, the CPU 11 operates the LF motor control section 35 to send the paper Q in a predetermined secondary scanning direction, thereby to print an image in stages on the paper Q, and to print an image based on the data to be printed.

Figure 4:
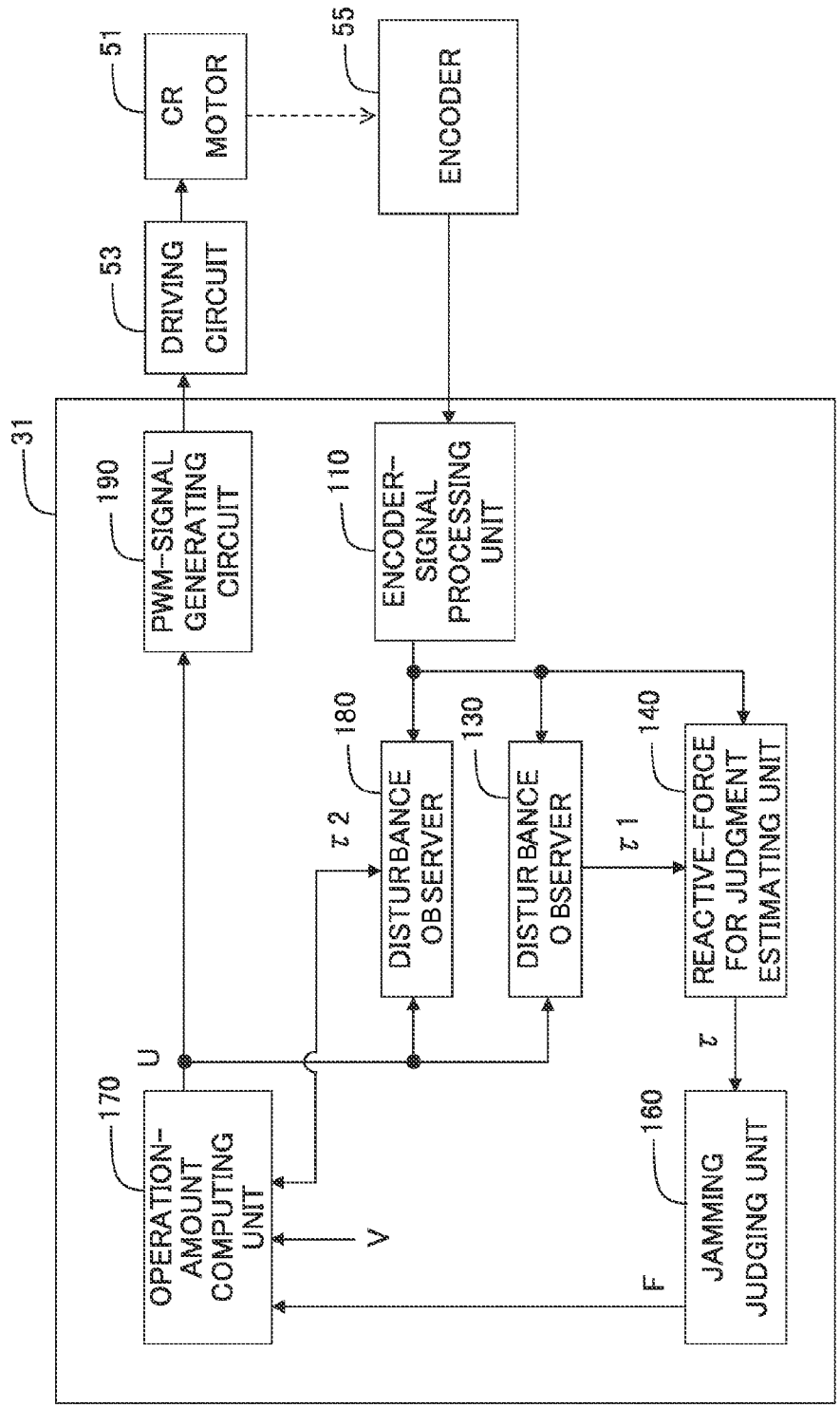
FIG. 4 is a block diagram showing a detailed configuration of a CR motor control section 31.

Next, a configuration of the CR motor control section 31 will be described below by using FIG. 4. The CR motor control section 31 of the embodiment, as shown in FIG. 4, includes an encoder-signal processing unit 110, a first disturbance observer 130, a reactive-force estimating unit for judgment (hereinafter, 'judgment reactive-force estimating unit') 140, a jamming judging unit 160, an control-input computing unit 170, a second disturbance observer 180, and a PWM-signal generating circuit 190. The CR motor control section 31 is realized by executing software by a microcomputer or hardware.

The encoder-signal processing unit 110 is arranged to measure the position and the velocity of the carriage 41 based on the output signal of the encoder 55. It is possible to realize a velocity measurement of the carriage 41 by measuring a pulse-edge interval (time interval) of a pulse signal which is output from the encoder 55 as the output signal, as hitherto been known. Moreover, regarding a position measurement of the carriage 41, it is possible to measure the position by counting the number of input pulses from the encoder 55 after the carriage 41 is arranged at a predetermined origin position. Concretely, the encoder-signal processing unit 110 counts the number of input pulses such that, in a case in which the carriage 41 is displaced in a forward direction, there is an increment of 1 for each pulse input, and in a case in which the carriage 41 is displaced in a reverse direction, there is a decrement of 1 for each pulse input. In such manner, the encoder-signal processing unit 110 is capable of measuring the position of the carriage 41. As it has hitherto been known, an A-phase signal and a B-phase signal having phases shifted mutually thereof are output from the encoder 55. Regarding a direction of displacement of the carriage 41, it is possible to identify the direction of displacement of the carriage 41 by a phase difference of the A-phase signal and the B-phase signal.

Moreover, the first disturbance observer 130, based on a velocity V of the carriage 41 calculated by the encoder-signal processing unit 110 and an operation amount U for the CR motor 51 output from the operation-amount computing unit 170, estimates a reactive force with respect to a force acting on the carriage 41 due to a motor drive, and inputs an estimated value of a reactive force (hereinafter, 'reactive-force estimated value') $\tau 1$ to the judgment reactive-force estimating unit 140.

The judgment reactive-force estimating unit 140 eliminates a component which is unnecessary for judging an occurrence of jamming from the reactive-force estimated value $\tau 1$, and inputs the reactive-force estimated value $\tau$ after elimination, to the jamming judging unit 160. The jamming judging unit 160, based on the reactive-force estimated value $\tau$ input from the judgment reactive-force estimating unit 140, makes a judgment of whether or not the jamming, in which the carriage 41 and the paper Q make a contact, has occurred. Moreover, in a case in which the jamming judging unit 160 has made a judgment that the jamming has occurred, a flag F=1 indicating the judgment that the jamming has occurred is input to the operation-amount computing unit 170, and in a case in which a judgment is made that the jamming has not occurred, a flag F=0 indicating the judgment that the jamming has not occurred is input to the operation-amount computing unit 170. In the following description, the judgment of whether or not the jamming has occurred is also indicated simply as a 'jamming judgment'.

The operation-amount computing unit 170 calculates the operation amount U for the CR motor 51 based on the flag F which is input from the jamming judging unit 160, a reactive-force estimated value τ2 which is input from the second disturbance observer 180, and the velocity V of the carriage 41 which has been measured by the encoder-signal processing unit 110, and inputs the operation amount U calculated, to the PWM-signal generating circuit 190. In the embodiment, an electric-current command value for the CR motor is to be calculated as the operation amount U, and the electric-current command value which has been calculated is to be input to the PWM-signal generating circuit 190.

In the second disturbance observer 180, similarly as in the first disturbance observer 130, a reactive force with respect to a force acting on the carriage 41 due to a motor drive is estimated, and the reactive-force estimated value τ2 is input to the operation-amount computing unit 170.

The PWM-signal generating circuit 190 generates the PWM signal such that the CR motor 51 is driven by a driving current corresponding to the operation amount which is input from the operation-amount computing unit 170, and inputs the generated PWM signal, to the driving circuit 53.

Figure 5:
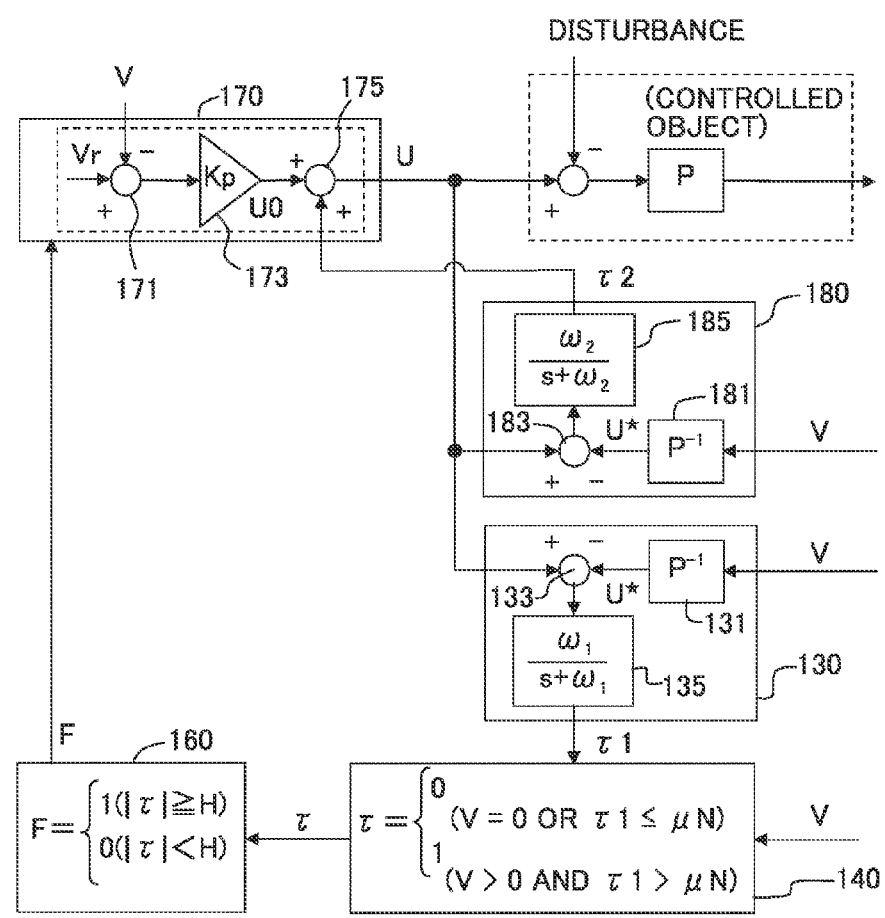
FIG. 5 is a block diagram showing a detailed configuration of the CR motor control section 31.

Next, a detailed configuration of the CR motor control section will be described by using FIG. 5. In the first disturbance observer 130, an input unit 131 inputs a measurement signal of the velocity V (such as time-series data of the velocity measured) by the encoder-signal processing unit 110, to an inverse model $P^{-1}$ of a controlled object. The inverse model $P^{-1}$ of the controlled object in this case is an inverse model $P^{-1}$ of an input-output characteristic model P=V/U of the operation amount U for the CR motor 51 and a controlled amount of the controlled object (velocity V of the carriage 41). In other words, the inverse model $P^{-1}$ of the controlled object is an inverse model $P^{-1}$ from the operation amount to the control amount. The 'controlled object' which is expressed by a mathematical model such as a transfer function P=V/U means a drive system which realizes the control amount V by the operation amount U. At least the PWM-signal generating circuit 190, the CR motor 51, and the carriage transporting mechanism 40 are included in this drive system.

It is possible to determine the inverse model $P^{-1}$ by expressing the input-output characteristic model P by a rigid model, for example. In other words, it is possible to determine the inverse model $P^{-1}$ by an inverse number (a reciprocal) $P^{-1}=(1/A) \cdot s$ when the input-output characteristic model P=A/s is expressed (indicated) by using Laplace operator s and a coefficient A (=K·α/J) which is determined by a torque constant K, a moment of inertia J, and a proportional coefficient α=V/ω between (derived from) the velocity V and a turning (rotational) angular velocity co.

In the first disturbance observer 130, a subtracter 133 generates a signal (differential signal) which indicates a difference (U−U') between an output U' of the inverse model $P^{-1}$ and the operation amount U for the CR motor 51 which is output from the operation-amount computing unit 170, and inputs the differential signal to a first low-pass filter 135. The first low-pass filter 135 is formed as a first-order low-pass filter of a cut-off frequency ω1, and damps a high-frequency component which is higher than the cut-off frequency ω1 by filtering the differential signal that has been input. Next, the first low-pass filter 135 inputs a differential signal after damping the high-frequency component, to the judgment reactive-force estimating unit 140.

It is difficult to model completely, the input-output characteristics of the controlled object. Even in a case in which a simple model such as the rigid model is set as the input-output characteristic model P corresponding to the inverse model $P^{-1}$, or even in a case in which a complicated model in which physical phenomena are mathematized accurately is set as the input-output characteristic model P corresponding to the inverse model $P^{-1}$, it is impossible to reproduce perfectly the input-output characteristics of the controlled object practically. In other words, there is some sort of error such as a modeling error between the practical input-output characteristics and input-output characteristics which have been modeled (input-output characteristic model P). Moreover, it has been known that such modeling error appears as a vibrational component in the differential signal. The first low-pass filter 135, as it will be described later, is used for eliminating from the differential signal such vibrational component due to the modeling error, or in other words, a vibrational component corresponding to mechanical characteristics of the controlled object.

Since the operation amount U is an electric-current command value, a unit of the difference (U−U') is ampere. However, there is a proportional relation between the electric current and torque (reactive force). Therefore, it is possible to treat that the difference (U−U') expresses the reactive-force estimated value τ1. In other words, the first disturbance observer 130 inputs to the judgment reactive-force estimating unit 140, the differential signal filtered by the low-pass filter 135 as a signal indicating the reactive-force estimated value τ1.

The judgment reactive-force estimating unit 140 subtracts a reactive force μN corresponding to a dynamic friction force from the reactive-force estimated value τ1, which is indicated by the input signal from the first disturbance observer 130. Then the judgment reactive-force estimating unit 140 eliminates a dynamic friction component which has not been taken into consideration in the input-output characteristic model P as a component unnecessary for jamming judgment, and inputs a reactive-force estimated value τ=τ1−μN after the elimination, to the jamming judging unit 160. Concretely, in the embodiment, assuming a coefficient of dynamic friction μ and a reactive force N to be constant, the judgment reactive-force estimating unit 140 inputs the reactive-force estimated value τ=τ1−μN based on the constant dynamic force of friction μN to the jamming judging unit 160.

However, the dynamic friction force is to be taken into consideration only in a case of moving the carriage 41. Therefore, in a state of the carriage 41 at halt, the dynamic friction force component is not included in the reactive-force estimated value τ. Moreover, the dynamic friction force is a force acting in a direction opposite to the direction of transporting the carriage 41. Therefore, it is not appropriate that a value obtained by subtracting the dynamic friction force component μN from the reactive-force estimated value τ1 becomes a negative value.

Therefore, the judgment reactive-force estimating unit 140, based on the velocity V measured by the encoder-signal processing unit 110, inputs 0 (τ=0) to the jamming judging unit 160 as the reactive-force estimated value τ, when the velocity is 0 (V=0) or when the reactive-force estimated value τ1 is not higher than μN (τ1≤μN), and only for other cases (in a case in which, V>0 and also, τ>μN), the judgment reactive-force estimating unit 140 inputs to the jamming judging unit 160 the reactive-force estimated value τ=τ1−μN which is obtained by subtracting the dynamic friction force component μ N from the reactive-force estimated value τ1.

The jamming judging unit 160 compares the reactive-force estimated value τ that has been input from the judgment reactive-force estimating unit 140 in such manner with a threshold value H that has already been set. When an absolute value |τ| of the reactive-force value τ is not smaller than the threshold value H, the jamming judging unit 160 outputs the flag F=1, and when the absolute value |τ| smaller than the threshold value H, the jamming judging unit 160 outputs the flag F=0. In such manner, the jamming judging unit 160 makes a judgment of whether or not the jamming has occurred, and in a case in which a judgment is made that the jamming has occurred, the jamming judging unit 160 outputs the flag F=1, and in a case in which a judgment is made that the jamming has not occurred, the jamming judging unit 160 outputs the flag F=0.

Moreover, the operation-amount computing unit 170, in a normal case in which the flag F=0, computes or calculates an operation amount U0 such that the carriage 41 follows a target velocity Vr, based on the target velocity Vr at the current time based on a velocity profile that has been set from the CPU 11, and the velocity V that has been measured by the encoder-signal processing unit 110. Further, the operation-amount computing unit 170 adds the operation amount U0 and the reactive-force estimated value $\tau 2$ that has been input from the second disturbance observer 180, and inputs the operation amount U=U0+$\tau 2$ after correction, to the PWM-signal generating circuit 190. The velocity profile is a profile which indicates a trajectory of the target velocity at each time from the time of start of control.

For instance, the operation-amount computing unit 170 is formed to have functions as a subtracter 171, a proportioning controller 173 and an adder 175. The subtracter 171 is configured to subtract the velocity V measured from the target velocity Vr at the current time which is specified from the velocity profile, and outputs the difference (Vr−V). The proportioning controller 173 is configured to output the operation amount U0=Kp (Vr−V) by allowing a gain Kp to act on the output (Vr−V) of the subtracter 171. The adder 175 is configured to correct the operation amount U0 by adding the reactive-force estimated value $\tau 2$ to the output U0=Kp (Vr−V) of the proportioning controller 173, and by inputting the operation amount U=U0+$\tau 2$ after the correction to the PWM-signal generating circuit 190. These functions are to be realized by a hardware or an execution of software by a microcomputer.

On the other hand, as the flag F=1 is input, the operation-amount computing unit 170 presumes that the jamming has occurred, and calculates the operation amount U for stopping the CR motor 51 and the carriage 41, and executes a stopping processing of inputting the operation amount U to the PWM-signal generating circuit 190.

Moreover, in the second disturbance observer 180, similarly as in the first disturbance observer 130, an input unit 181 inputs a measurement signal of the velocity V from the encoder-signal processing unit 110 to the inverse model $P^{-1}$ of the controlled object, and a subtracter 183 inputs to a second low-pass filter 185 a differential signal indicating a difference between (U−U*) and an output U* of the inverse model $P^{-1}$ and the operation amount U for the CR motor 51, that is output from the operation-amount computing unit 170.

The second low-pass filter 185 is formed as a primary low-pass filter of a cut-off frequency $\omega 2$. The second low-pass filter 185 filters the differential signal that has been input from the subtracter 183, and damps the frequency component which is higher than the cut-off frequency $\omega 2$. Moreover, the second low-pass filter 185 inputs a differential signal after damping of a high-frequency component, which is a filtered signal, to the operation-amount computing unit 170 as a signal which indicates the reactive-force estimated value $\tau 2$. An inverse model $P^{-1}$ which is to be set in the second disturbance observer 180 is same as in the first disturbance observer 130.

In the CR motor control section 31 of the embodiment, due to such arrangement, a feedback control of the velocity of the carriage 41 is carried out and also a judgment of jamming using the first disturbance observer 130 and stopping processing of the CR motor 551 and the carriage 41 based on a judgment result is carried out.

Incidentally, apart from the second disturbance observer 180, the first disturbance observer 130 which is provided exclusively for judging jamming, is for setting the cut-off frequency $\omega 1$ of the first low-pass filter 135 in the first disturbance observer 130 to a value smaller than the cut-off frequency $\omega 2$ of the second low-pass filter 185 in the second disturbance observer 180, and suppressing a misjudgment caused due to the vibrational component of the differential signal (U−U*) due to the mechanical characteristics of the controlled object. The vibrational component, as mentioned above, is due to the modeling error of the inverse model $P^{-1}$, and corresponds to a vibration mode of the controlled object.

For the second disturbance observer 180, a difference or a discrepancy between the inverse model and the practical input-output characteristics of the controlled object is also deemed as a disturbance, and for suppressing an effect thereof, the cut-off frequency $\omega 2$ is to be set such that the vibrational component of the differential signal (U−U*) due to the mechanical characteristics of the controlled object is not damped. To add a remark, the cut-off frequency $\omega 2$ is to be set to a substantial extent such that an electrical noise of the differential signal is not excited.

Whereas, regarding the first disturbance observer 130 for judging jamming, as the vibrational component of the differential signal (U−U*) due to the mechanical characteristics of the controlled object is included in the reactive-force estimated value $\tau 1$ thereof, when the vibrational component has appeared to be substantial with an acceleration in particular, the reactive-force estimated value $\tau$ surpasses the threshold value H in spite of the fact that there has been no jamming. Moreover, due to this event, there is a misjudgment of jamming in the jamming judging unit 160, and the processing of stopping the CR motor 51 and the carriage 41 is carried out in the operation-amount computing unit 170.

Figure 6A:
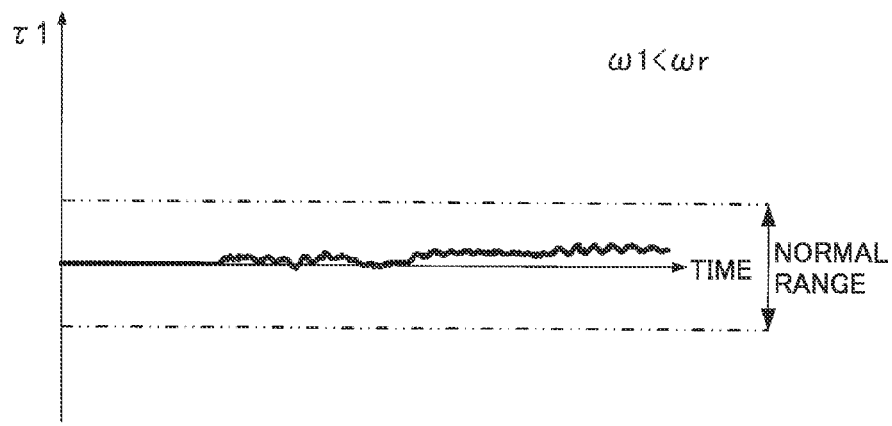
FIG. 6A and FIG. 6B are graphs showing as to how an estimated value of a reaction force τ1 fluctuates (changes)

A graph shown in FIG. 6A is a graph in which the reactive-force estimated value $\tau 1$ which is obtained in a case in which the carriage 41 is subjected to a velocity control at a constant velocity Vc after being subjected to an acceleration control while being accelerated from a halted state to the constant velocity Vc, and the reactive-force estimated value $\tau 1$, which is a value when the cut-off frequency $\omega 1$ of the first low-pass filter 135 is smaller than a vibrational frequency $\omega r$ which is a frequency of the vibrational component corresponding to the mechanical characteristics of the controlled object, is indicated upon letting a horizontal axis to be time and a vertical axis to be the reactive-force estimated value $\tau 1$. Whereas, FIG. 6B shows a graph in which the reactive-force estimated value $\tau 1$ which is obtained in a case in which a similar control as in FIG. 6B is carried out, and the reactive-force estimated value $\tau 1$ when the cut-off frequency $\omega 1$ of the first low-pass filter 135 is set to a value higher than the vibrational frequency $\omega r$, is indicated upon letting a horizontal axis to be time and a vertical axis to be the reactive-force estimated value $\tau 1$.

Figure 6B:
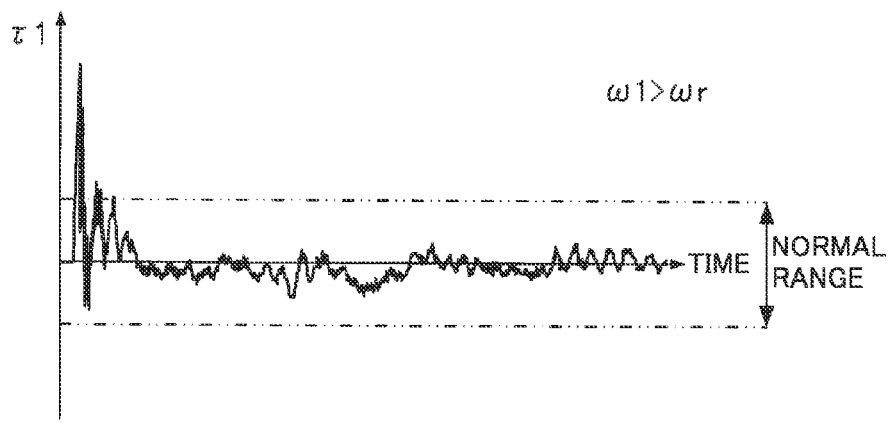

As shown in FIG. 6B, when the cut-off frequency $\omega 1$ of the first low-pass filter 135 is set to be a value higher than the vibration frequency $\omega r$, since the vibrational component appears substantially in the reactive-force estimated value $\tau 1$, there is a possibility of occurrence of misjudgment of jamming by the jamming judging unit 160.

Therefore, according to the embodiment, for suppressing a control error, by setting the cut-off frequency $\omega 1$ of the first low-pass filter 135 to a value smaller than the vibrational frequency $\omega r$, with respect to the cut-off frequency $\omega 2$ of the second low-pass filter 185 which is to be set to a value higher than the vibrational frequency ωr, the judgment of whether or not the jamming has occurred is made based on the output of the first disturbance observer 130 while suppressing the misjudgment of jamming by the jamming judging unit 160.

It is possible to obtain the vibrational frequency ωr by test-running the printer apparatus 1, and by carrying out frequency analysis of an output signal from the subtracter 133 which has been achieved by test-running, and detecting a peak of a frequency spectrum. Regarding the cut-off frequency ω1, smaller the value which is set, harder is the occurrence of misjudgment of jamming, and when the cut-off frequency ω1 is set to be excessively small, the time after the paper Q and the carriage 41 start making a contact, till the judgment is made by the jamming judging unit 160 that the jamming has occurred, becomes long, and it is not preferable to set the cut-off frequency ω1 to be excessively small.

Therefore, at the time of designing the printer apparatus 1, it is preferable to determine an acceptable value of time 'Tjam' after the paper Q and the carriage 41 start making a contact, till the judgment is made by the jamming judging unit 160 that the jamming has occurred, and to set the cut-off frequency ω1 to a value higher than 2π/Tjam. Here, although the 'cut-off frequency' is expressed as col, col is for indicating an angular frequency.

Figure 7A:
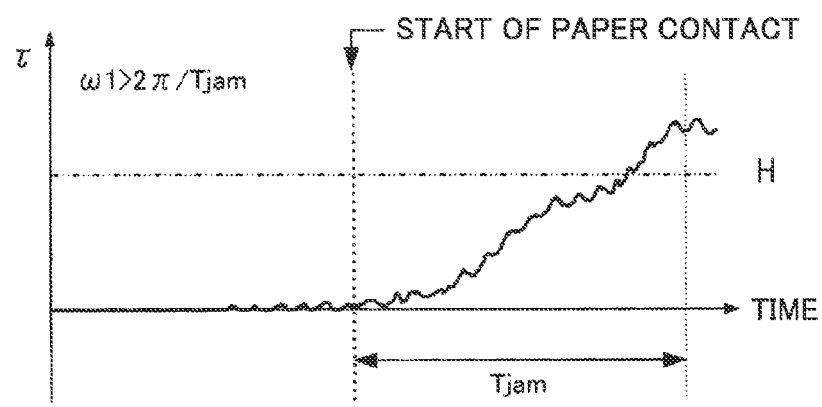
FIG. 7A and FIG. 7B are graphs showing as to how an estimated value of a reactive force τ fluctuates (changes) when there is a jamming.

As shown in FIG. 7A, when the cut-off frequency ω1 is set to a value higher than 2π/Tjam, during the time since the paper Q and the carriage 41 start making a contact, till the time Tjam, an effect of the contact appears clearly in the reactive-force estimated value τ, and by setting of an appropriate threshold value H, it is possible to judge with high accuracy whether the jamming has occurred or not at the time Tjam.

Figure 7B:
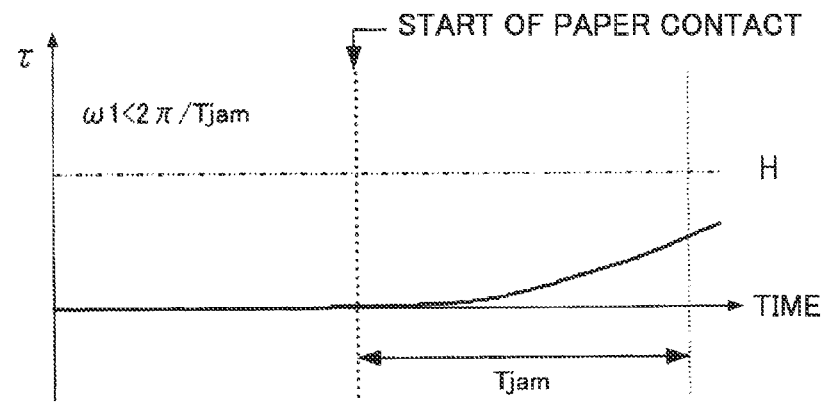

On the other hand, as shown in FIG. 7B, when the cut-off frequency ω1 is set to a value smaller than 2π/Tjam, during the time since the paper Q and the carriage 41 start making a contact till the time Tjam, the effect of the contact does not appear sufficiently in the reactive-force estimated value τ, and it is difficult to judge with high accuracy whether or not a rise in the reactive-force estimated value τ is due to the occurrence of jamming. In other words, during the time Tjam, since the effect due to the contact is not reflected sufficiently in the reactive-force estimated value τ, there is a limit on high accuracy of judgment of jamming even with an adjustment of the threshold value H.

Therefore, it is preferable to set the cut-off frequency ω1 to a value smaller than the vibrational frequency ωr and higher than 2π/Tjam. Regarding the threshold value H, it is preferable to set near the minimum value of the reactive-force estimated value τ reached with a probability above certain level at the time Tjam after the paper Q and the carriage 41 have started making a contact, when the cut-off frequency ω1 is set in the second low-pass filter 135 while setting the cut of frequency ω1 to a value higher than 2π/Tjam.

Figure 8A:
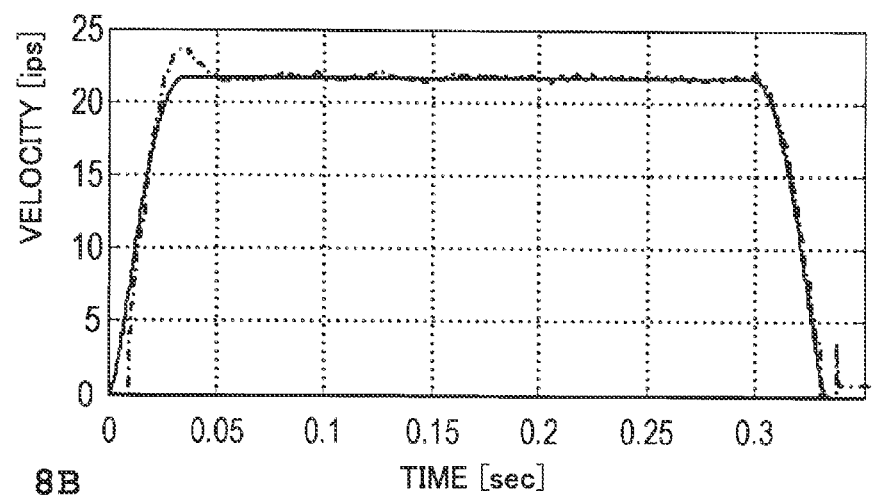
FIG. 8A and FIG. 8B are graphs showing as to how estimated values of reactive forces τ1 and τ2, and velocities Vr and V fluctuate.
Figure 8B:
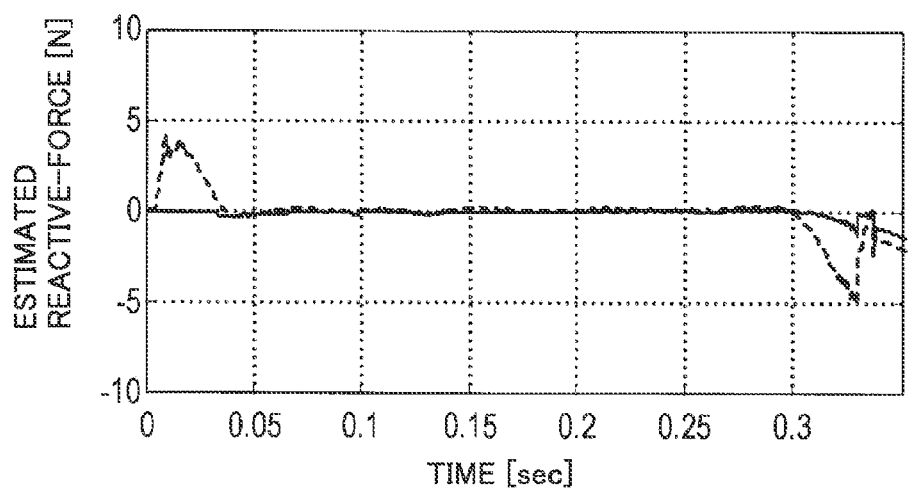

As to how the reactive-force estimated values τ1 and τ2 fluctuate in a case in which the cut-off frequencies ω1 and ω2 appropriate to an application in such manner, is shown in FIG. 8A and FIG. 8B together with as to how the target velocity Vr and the measured velocity V of the carriage 41 fluctuate. FIG. 8A and FIG. 8B are diagrams showing the fluctuation or the change in an environment in which no jamming has occurred.

A solid line shown in the graph in FIG. 8A is a velocity profile (trajectory of the target velocity Vr) at the time of controlling transporting of the carriage 41 in the main scanning direction. Whereas, an alternate long and short dashed line shown in the graph in FIG. 8B is the velocity V of the carriage 41 that is measured when such control of transporting is carried out.

Moreover, a solid line shown in the graph in FIG. 8B is an output (reactive-force estimated value τ1) of the first disturbance observer, and a dashed line shown in the graph in FIG. 8B is an output (reactive-force estimated value τ2) of the second disturbance observer 180. As it can be understood from FIG. 8B, when the cut-off frequency ω1 is set appropriately, it is possible to suppress appropriately an occurrence of misjudgment of jamming by having an effect of the vibrational component which appears substantially at the time of acceleration. Then, the reactive-force estimated value τ1 is not raised as the reactive force estimated value τ2 during the acceleration of the carriage 41.

Figure 9A:
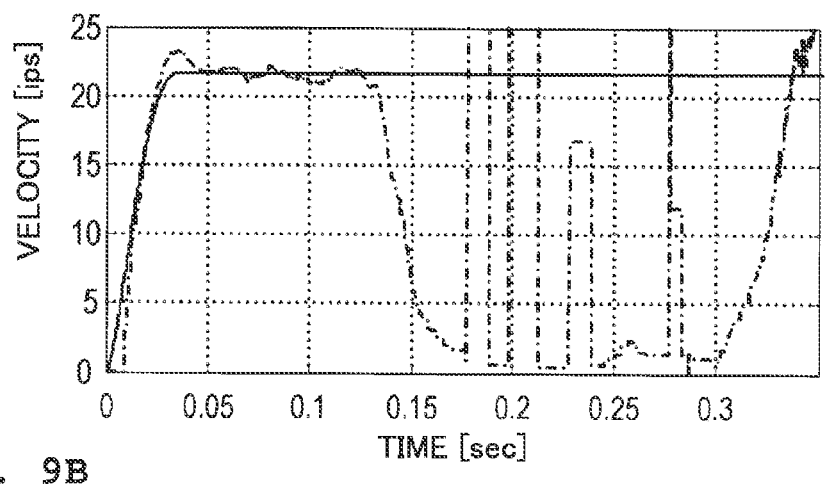
FIG. 9A and FIG. 9B are graphs showing as to how the estimated value of reactive forces (reactive-force estimated values) τ1 and τ2, and the velocities Vr and V fluctuate when there is a jamming.
Figure 9B:
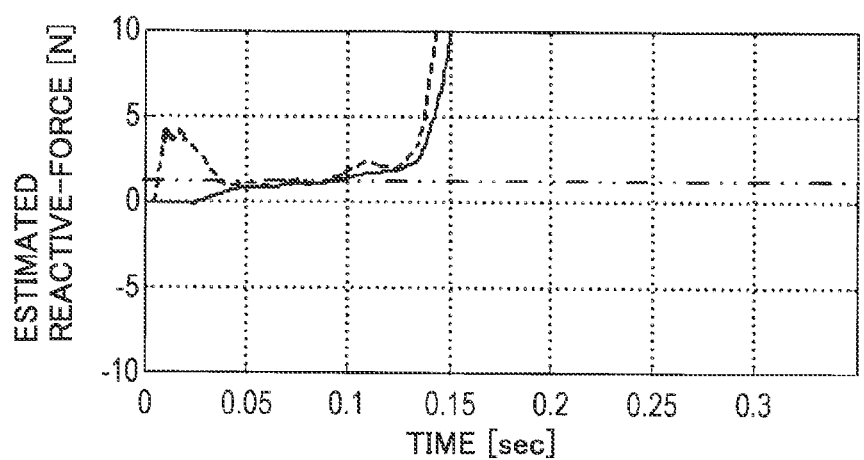

On the other hand, as to how the reactive-force estimated values τ1 and τ2 fluctuate when the jamming has occurred in the process of control of transporting the carriage 41, is shown in FIG. 9A and FIG. 9B together with as to how the target velocity Vr and the measured velocity V of the carriage 41 fluctuate. Similarly as in FIG. 8A, a solid line in FIG. 9A indicates the target velocity Vr of the carriage 41, and an alternate long and short dashed line indicates the measured velocity V of the carriage 41. Moreover, similarly as in FIG. 8B, a solid line in FIG. 9B indicates the output (reactive-force estimated value τ1) of the first disturbance observer 130, and an alternate long and short dashed line indicates the output (reactive-force estimated value τ2) of the second disturbance observer 180. Moreover, an alternate long and two short dashes line corresponds to the threshold value.

As it can be understood from FIG. 9A and FIG. 9B, according to the embodiment, since the cut-off frequency ω1 is set appropriately, it is possible to suppress the reactive-force estimated value τ1 from rising substantially during the acceleration. On the other hand, in a case in which there is a contact between the carriage 41 and the paper Q, since the reactive-force estimated value τ1 rises sensitively, it is possible to detect jamming promptly as well as highly accurately.

In other words, as a prior art, a technology for detecting a collision with a foreign object based on a deviation of the measured velocity V from the target velocity Vr has been known. However, according to the present embodiment, it is possible to detect a contact with a foreign object (paper Q) more quickly than the detection based on the deviation of the measured velocity V from the target velocity Vr.

Moreover, as a prior art, a technology for detecting a collision with a foreign object with an output of a disturbance observer as an index, has been known. According to the prior art, since an idea of letting the cut-off frequency ω1 to be smaller than ωr was not there, even when such technology is adopted, the threshold value H had to be set to be high for suppressing the misjudgment during acceleration, a contact with the foreign object could not be detected promptly. Whereas, according to the present embodiment, it is possible to detect a contact with the foreign object promptly.

Figure 10:
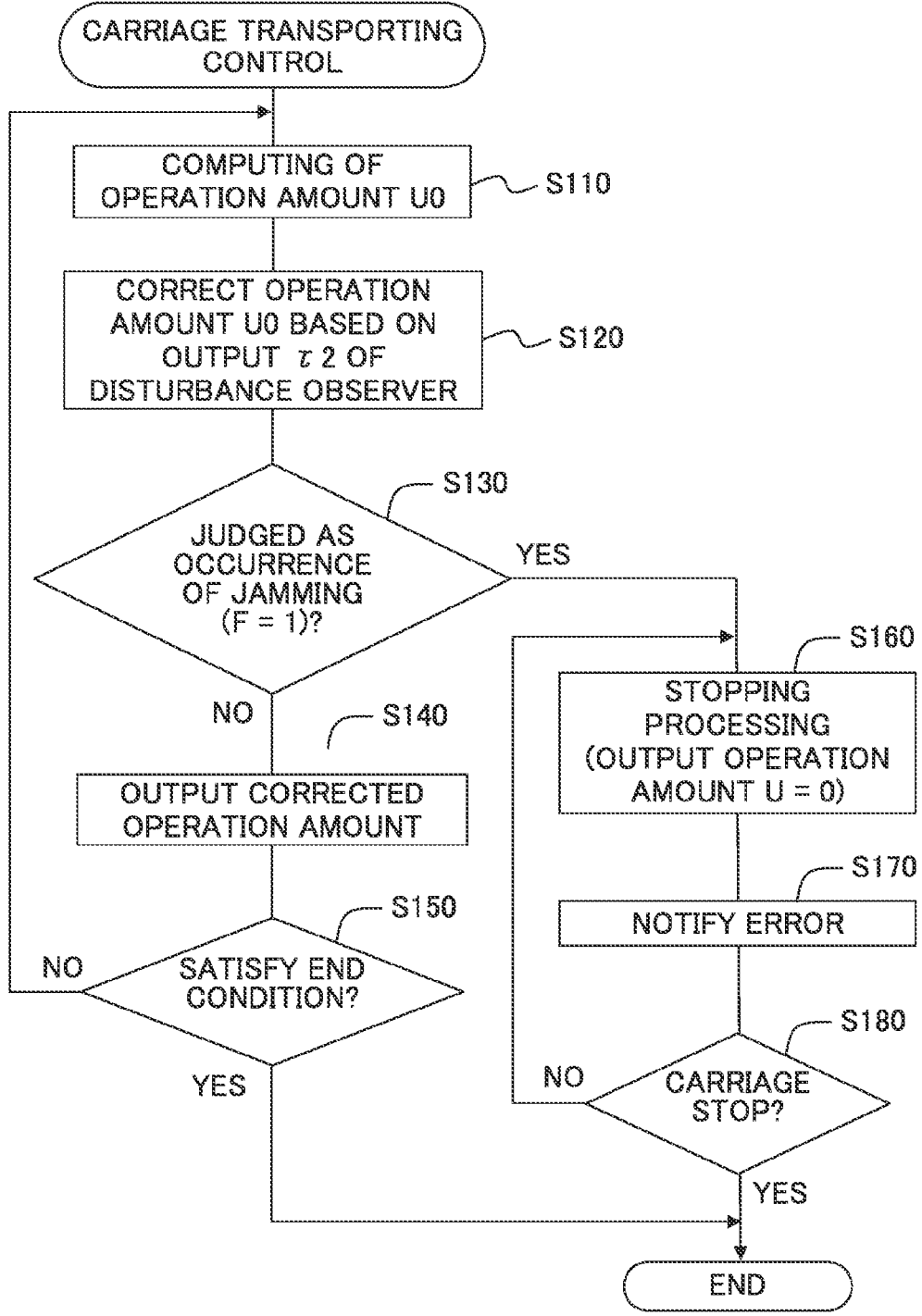
FIG. 10 is a flowchart related to a transporting control of a carriage 41 carried out by an operation-amount computing unit 170.

The technology for judging jamming has been described above, and the operation-amount computing unit 170 switches the output of the operation amount U as shown in FIG. 10, based on the flag F input from the jamming judging unit 160.

In other words, as the operation-amount computing unit 170 starts the control of the CR motor 51, or in other words, the control of transporting the carriage 41 based on the command from the CPU 11, (the operation-amount computing unit 170) carries out a velocity control of the carriage 41 based on the velocity profile till the flag F input from the jamming judging unit 160 is switched from a value 0 to a value 1 (steps from S110 to S150).

Concretely, the operation-amount computing unit 170 computes the operation amount U0 such that the carriage 41 follows the target velocity Vr based on the target velocity Vr at the current time based on the velocity profile and the velocity V which has been measured by the encoder-signal processing unit 110 (step S110, hereinafter simply referred to as "S110"), and corrects the operation amount U0 by adding the operation amount U0 computed and the reactive-force estimated value τ2 input from the second disturbance observer 180 (S120). In other words, the operation-amount computing unit 170 computes the operation amount U=U0+τ2, that is to be input to the PWM-signal generating circuit 190 (S120).

Moreover, in a case in which, the flag F to be input from the jamming judging unit 160 is 0 (No at step S130), the operation-amount computing unit 170 inputs the operation amount U after the correction which has been calculated at step S120, to the PWM-signal generating circuit 190, and makes an arrangement such that the CR motor 51 is driven by a drive current corresponding to the operation amount U, and the carriage 41 is transported (S140).

Moreover, the operation-amount computing unit 170 makes a judgment of whether or not a condition for termination or completion of the control of transporting of the carriage 41 has been satisfied (S150). In a case in which the operation-amount computing unit 170 makes a judgment that the condition for termination has not been satisfied (No at step S150), the process shifts to step S110. In such manner, the operation-amount computing unit 170 carries out processing at steps from S110 to S150 till either a judgment is made that the condition for termination has been satisfied (Yes at step S150) or till the flag F input from the jamming judging unit 160 is switched from value 0 to value 1 (Yes at step S130). Moreover, when the condition for termination is satisfied (step S150), the operation-amount computing unit 170 terminates the control of transporting the carriage 41.

At step S150, when it is time for termination of control based on the velocity profile for example, it is presumed that the condition for termination has been satisfied, and it is possible to terminate the control of transporting the carriage 41. Moreover, under a condition that the carriage 41 halted for a certain period of time, it is possible to terminate the control of transporting the carriage 41. A judgment of whether or not the carriage 41 halted for a certain period of time can be made by referring to a position X of the carriage 41 measured by the encoder-signal processing unit 110.

On the other hand, as the flag F that is input from the jamming judging unit 160 switches from the value 0 to value 1, the operation-amount computing unit 170 detects an occurrence of jamming (Yes at step S130), and while executing the process of stopping the CR motor 51 and the carriage 41, the operation-amount computing unit 170 carries out an error notification to the CPU 11 informing that the jamming has occurred. The CPU 11, upon receiving the error notification, is capable of making the error notification to a user by an output of a buzzer sound or a message display through a display of the user interface 17.

Moreover, it is possible to realize the stopping processing by a process of inputting the operation amount U=0 to the PWM-signal generating circuit 190, without using the operation amount U which has been computed at step S120. As another example, in the stopping processing, the operation amount U may be let to be a minus output in the transporting direction to decelerate and to stop the CR motor 51.

The operation-amount computing unit 170 carries out such stopping processing and error notification (S170) continuously till the carriage 41 stops, and when a judgment is made that the carriage 41 has stopped (Yes at step S180), terminates the control of transporting of the carriage 41.

The printer apparatus 1 of the present embodiment has been described above. According to the present embodiment, the judgment of jamming based on the difference (U−U*) between the output U* of the inverse module and the operation amount U is made. The differential signal is input to the first low-pass filter having the cut-off frequency ω1 smaller than the frequency ωr capable of damping the vibrational component due to the mechanical characteristics of the controlled object, and the judgment of jamming based on the filtering signal having passed through the filter is made.

Therefore, according to the present embodiment, it is possible to suppress the occurrence of misjudgment of jamming caused due to the vibrational component due to the mechanical characteristics of the controlled object. Particularly, the vibrational component included in the differential signal becomes substantial during acceleration, and according to the present embodiment, it is possible to carry out the judgment of jamming highly accurately even during such acceleration. Therefore, the technology for judging jamming of the present embodiment mentioned above is extremely useful for the printer apparatus 1 in which, the jamming may occur during the acceleration of the carriage 41.

Moreover, according to the present embodiment, the second disturbance observer 180 for suppressing the control error and the first disturbance observer 130 for judging jamming are provided separately, and an arrangement is made such that the appropriate cut-off frequencies ω1 and ω2 can be set respectively in each disturbance observer. In other words, an arrangement is made such that, the cut-off frequency ω1 of the first low-pass filter 135 can be set to be lower than the cut-off frequency ω2 of the second low-pass filter 185. Moreover, while an arrangement is made such that in the first low-pass filter 135, it possible to suppress the misjudgment of jamming by eliminating the vibrational component due to the mechanical characteristics of the controlled object, an arrangement is made in the second low-pass filter 185, such that the vibrational component is not eliminated, and it is possible to carry out the appropriate velocity control of the carriage 41, in which the control error is suppressed. Therefore, according to the present embodiment, by using the first disturbance observer 130 and the second disturbance observer 180, it is possible to realize simultaneously the inhibition of control error and misjudgment of jamming.

Particularly, since it is possible to detect jamming promptly and highly accurately based on the output of the first disturbance observer 130, it is possible to suppress the time and trouble taken by the user for the job of removing the paper Q to eliminate jamming when the jamming is progressing, and to suppress the nozzle surface of the recording head 21 from being damaged due to the progress of jamming.

Incidentally, the mechanical characteristics of the controlled object vary for each substance, and change with the lapse of time. Therefore, in the printer apparatus 1, it is possible to provide a function of updating frequency characteristics of the first low-pass filter 135 as in a first modified embodiment shown below.

First Modified Embodiment

A printer apparatus 1 of the first modified embodiment is a printer apparatus in which a function of updating the cut-off frequency ω1 of the first low-pass filter 135 is provided to printer apparatus 1 of the embodiment described above. Since the printer apparatus 1 of the first modified embodiment has the same basic structure as of the printer apparatus 1 of the embodiment, in the following description, the description of the same structure will be omitted, and the structure peculiar to the printer apparatus 1 of the first modified embodiment will be described selectively.

Figure 11:
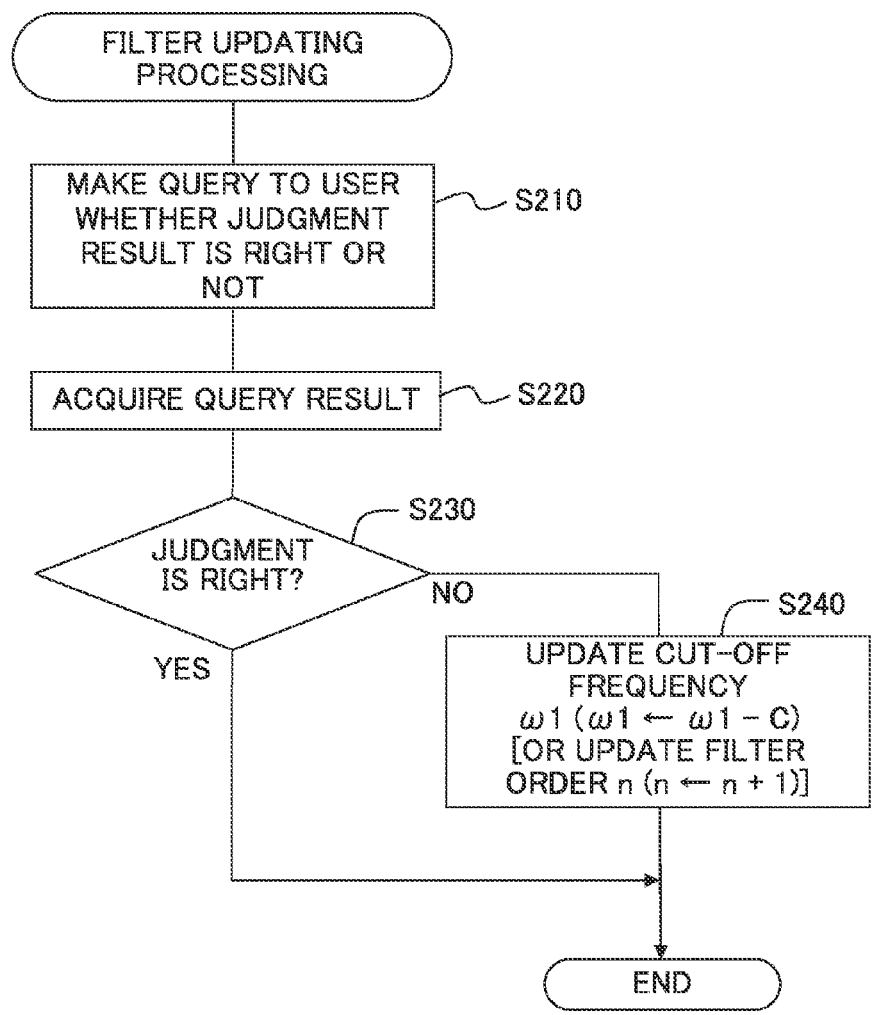
FIG. 11 is a flowchart showing a filter updating processing which a CPU 11 executes.

As the CPU 11 in the printer apparatus 1 of the first modified embodiment receives the error notification informing that the jamming has occurred, from the CR motor control section 31 upon switching of the value of the flag F from 0 to 1, the CPU 11 executes filter updating processing shown in FIG. 11.

As the filter updating processing starts, the CPU 11, by using the user interface 17, displays to the user a message of making a query for whether or not the judgment result of jamming is correct (S210), and acquires operation information indicating a reply to the query from the user via the user interface 17 (S220). Moreover, the CPU 11 makes a judgment of whether or not the reply indicating the operation information which has been achieved is a reply informing that the judgment result is correct (S230). When the CPU 11 makes a judgment that the reply is a reply informing the correct judgment result (Yes at step S230), the CPU 11 terminates the filter updating processing without updating the cut-off frequency $\omega 1$.

Whereas, when the CPU 11 makes a judgment that the reply is a reply informing that the judgment result is wrong (No at step S230), with the current cut-off frequency $\omega 1$, a possibility that the vibrational component appears substantially in the first low-pass filter 135 being high, the process shifts to step S240, and the CPU 11 updates the cut-off frequency $\omega 1$ of the first low-pass filter 135 in a direction of lowering a predetermined amount C. Thereafter, the CPU 11 terminates the filter updating processing.

Regarding the predetermined amount C, a designer of the printer apparatus 1 can determine the value in advance to an appropriate value. Moreover, regarding the cut-off frequency $\omega 1$, it is possible to store in the EEPROM 15. Moreover, it is possible to make an arrangement in the printer apparatus 1 such that, at the time of putting an electric power supply of the printer apparatus 10N, the CPU 11 reads the cut-off frequency $\omega 1$ after the updating from the EEPROM 15, and sets in the first low-pass filter 135.

The printer apparatus 1 of the first modified embodiment has been described above. According to the printer apparatus 1 of the embodiment, as information indicating that the misjudgment has occurred is input via the user interface 17, the CPU 11 updates the cut-off frequency $\omega 1$ of the first low-pass filter 135 in the direction of lowering. In a case in which such misjudgment has occurred, when the frequency characteristics of the first low-pass filter 135 are updated, it is possible to study and update appropriately the frequency characteristics of the first low-pass filter 135 in accordance with the change with the lapse of time of the mechanical characteristics of the controlled object, and to suppress the misjudgment of jamming.

Moreover, it has been mentioned that the mechanical characteristics of the controlled object differ from substance to substance. At the time of manufacturing the printer apparatus 1, without taking into consideration the difference from substance to substance, standard frequency characteristics are to be set in the first low-pass filter 135. At the time of shipping the printer apparatus 1 from the factory, the printer apparatus 1 is to be test-run, and if necessary, the frequency characteristics of the first low-pass filter 135 are to be updated by the filter updating processing. By making such arrangement, it is possible to suppress the rate of misjudgment from varying according to the substance, and to provide the printer apparatus 1 of high quality to the user.

Moreover, in the abovementioned description, an arrangement has been made such that the frequency characteristics of the first low-pass filter 135 are updated by updating the cut-off frequency $\omega 1$ in the direction of lowering. However, an arrangement may be made such that, at step S240, the misjudgment of jamming is suppressed by updating an order of the first low-pass filter in a direction of increasing as it will be described later, instead of updating the cut-off frequency $\omega 1$ in the direction of lowering.

For instance, an arrangement may be made such that, the first low-pass filter 135 is formed such that the first-low-pass filter 135 can be updated to a first-order filter $\{\omega 1/(s+\omega 1)\}$, a second-order filter $\{\omega 1/(s+\omega 1)\}^2$, a third-order filter $\{\omega 1/(s+\omega 1)\}^3$, and further to an $n^{th}$ order filter $\{\omega 1/(s+\omega 1)\}^n$ of high order, and at step 240, the order n is updated to a value obtained by adding 1 to the current set value. It means that every time step S240 is executed, the first low-pass filter 135 is switched from the first-order filter to the second-order filter, and from the second-order filter to the third-order filter. As the filter order n is increased, an attenuation gradient at the first low-pass filter 135 becomes high (in other words, becomes precipitous). As a result, it becomes possible to damp sufficiently the vibrational component of a frequency band slightly higher than the cut-off frequency $\omega 1$, and due to the vibrational component, it is possible to suppress the occurrence of misjudgment of jamming.

Figure 12A:
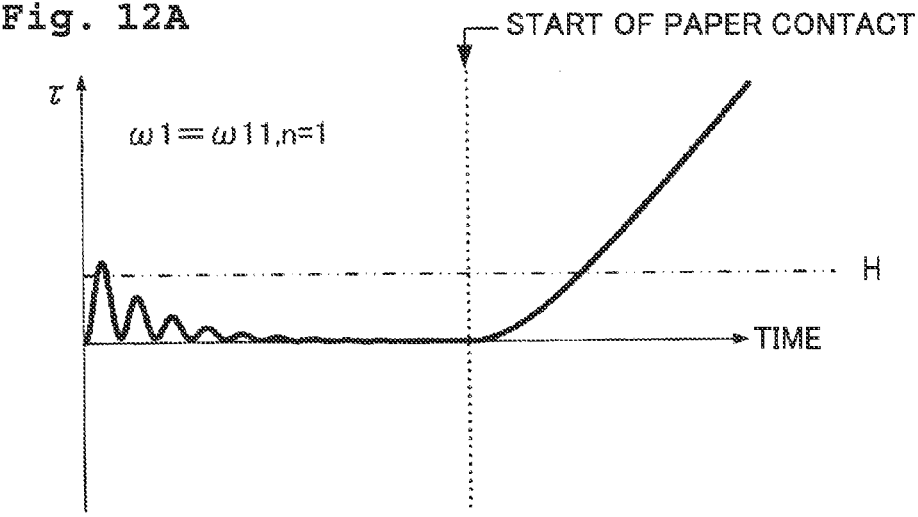
FIG. 12A, FIG. 12B, and FIG. 12C are graphs showing as to how the estimated value of the reactive force τ fluctuates for each combination of a cut-off frequency ω1 and an order n.
Figure 12B:
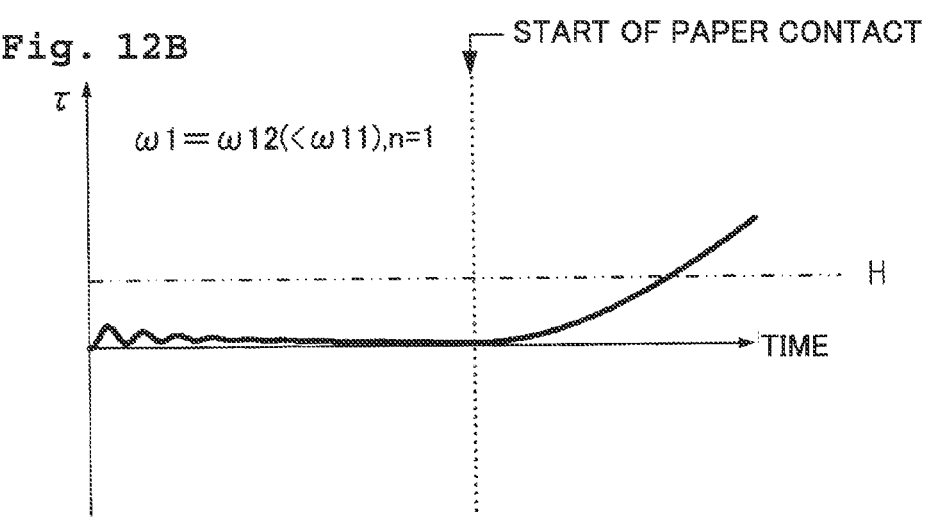
Figure 12C:
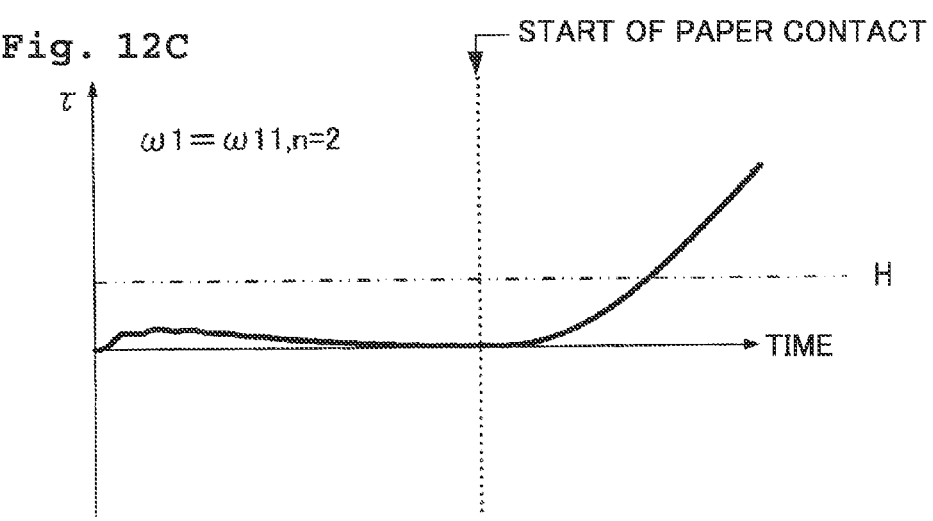

In FIG. 12A, it is shown as to how the reactive-force estimated value $\tau$ rises at the time when the carriage 41 and the paper Q make a contact, when a low-pass filter of which the cut-off frequency $\omega 1$ is an initial value $\omega 11$ and the order is the first order, has been used as the first low-pass filter 135. In FIG. 12B, it is shown as to how the reactive-force estimated value $\tau$ rises at the time when the carriage 41 and the paper Q make a contact, when a low-pass filter of which the cut-off frequency $\omega 1$ is a value $\omega 12$ which is smaller than the initial value $\omega 11$ ($\omega 12<\omega 11$) and the order is the first order, has been used as the first low-pass filter 135. In FIG. 12C, it is shown as to how the reactive-force estimated value $\tau$ rises at the time when the carriage 41 and the paper Q make a contact, when a low-pass filter of which, the cut-off frequency $\omega 1$ is the initial value $\omega 11$ and the order is the second order, has been used as the first low-pass filter 135.

As shown in FIG. 12A, in the printer apparatus 1 in which an event that the reactive-force estimated value $\tau$ surpasses the threshold value H in spite of the fact that there has been no contact between the carriage 41 and the paper Q occurs, when the cut-off frequency $\omega 1$ is updated to the value $\omega 12$ which is smaller than the initial value $\omega 11$ ($\omega 12<\omega 11$), or as the order n is updated from the first order to the second order, it is possible to suppress an occurrence of such event, and to suppress the misjudgment of jamming.

It is possible to realize such updating of the frequency characteristics by a simple arrangement of adopting a method of updating the cut-off frequency $\omega 1$ rather than adopting a method of updating the order n. It is also possible to form the first low-pass filter 135 by hardware. In this case, a hardware configuration in which a low-pass filter for each order is built-in in the CR motor control section 31, and the low-pass filter to be used is switched according the filter updating processing, may become necessary as the low-pass filter 135. Moreover, the updating of the frequency characteristics may be realized by combining the updating of the cut-off frequency $\omega 1$ and the updating of the order n. It is needless to mention that it is possible to form the second low-pass filter as well, by hardware.

Moreover, in the first modified embodiment, an example in which, when a judgment that the jamming has occurred is made by the jamming judging unit 160, the CPU 11 executes the filter updating processing has been described. At the time of start-up of the printer apparatus 1, a possibility that the paper Q is around the transporting path of the carriage 41 is extremely low, and a possibility that the paper Q is in an environment in which jamming does not occur is high. Moreover, in such environment, in a case in which the judgment that the jamming has occurred is made by the jamming judging unit 160, it is possible to identify that the judgment that the jamming has occurred is a misjudgment, even when there has been no information input from the user.

Therefore, in the printer apparatus 1, an arrangement may be made such that the frequency characteristics of the first low-pass filter 135 are updated based on the reactive-force estimated value $\tau$ which has been obtained when there is no paper Q around the transporting path of the carriage 41 at the time of start-up of the printer 1.

Second Modified Embodiment

A printer apparatus 1 of a second modified embodiment is a printer apparatus in which a function of updating the frequency characteristics of the first low-pass filter 135, at the time of start-up of the printer apparatus 1 is provided to the printer apparatus 1 of the embodiments including the first modified embodiment. Since the printer apparatus 1 of the second modified embodiment has the same basic structure as the abovementioned printer apparatuses 1, in the following description, the description of the same structure will be omitted, and the structure peculiar to the printer apparatus 1 of the second modified embodiment will be described selectively.

Figure 13:
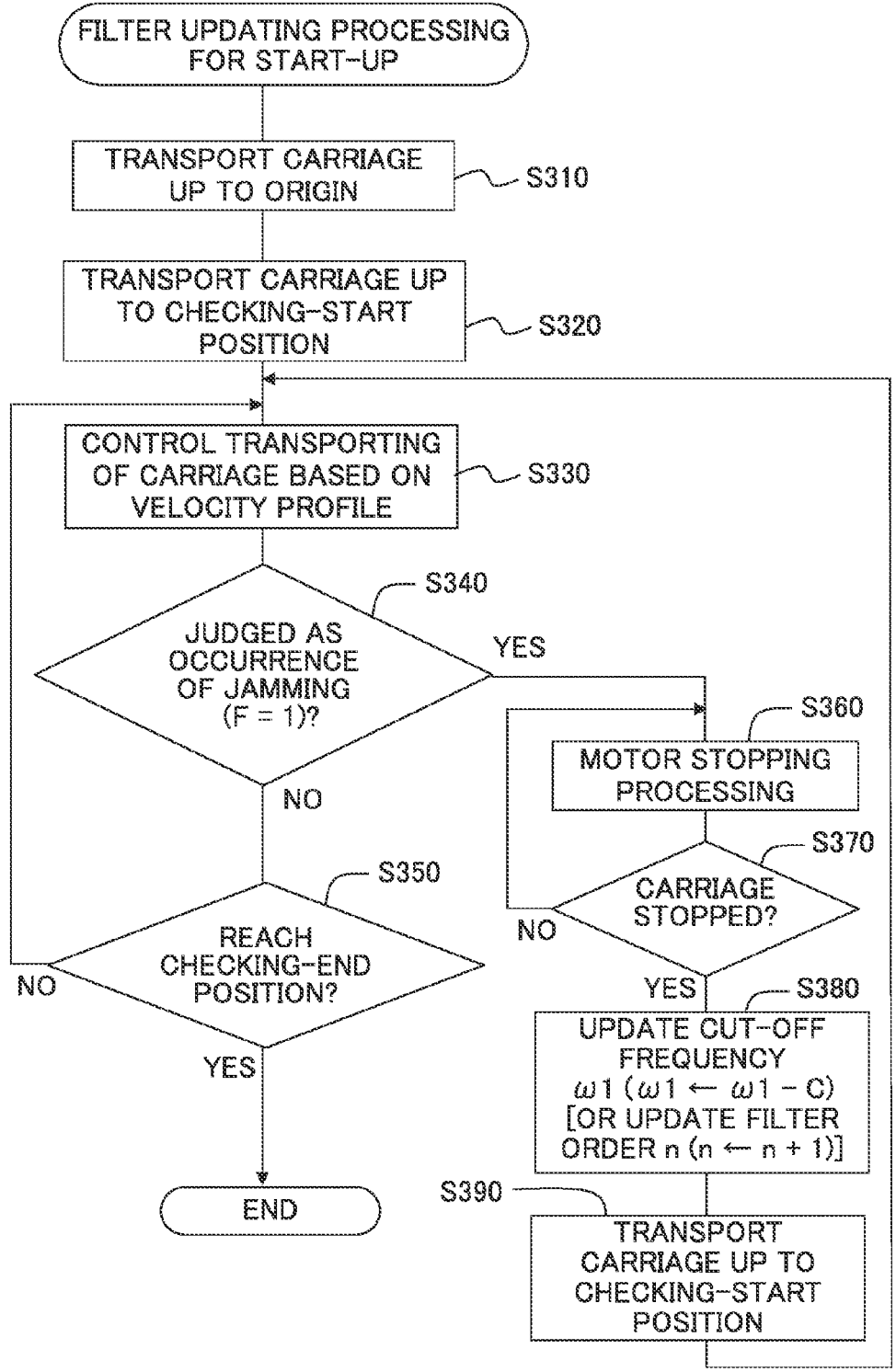
FIG. 13 is a flowchart showing a filter updating processing at the time of start-up (hereinafter, 'start-up time filter updating processing) which, the operation amount computing unit 170 executes.

In the printer apparatus 1 of the second modified embodiment, immediately after the start-up upon putting the electric power supply ON, the CR motor control section 31 executes filter updating processing at the time of start-up (hereinafter, 'start-up time filter updating processing') shown in FIG. 13, based on the command from the CPU 11. Concretely, the operation-amount computing unit 170 executes the start-up time filter updating processing shown in FIG. 13 according to the command which has been input from the CPU 11.

As the start-up time filter updating processing is started, the operation-amount computing unit 170, after the carriage 41 is arranged at the origin position (step S310) by the control of the CR motor 51 by the output of the operation amount, moves the carriage 41 from the origin position up to a checking-start position (testing-start position) (S320). The origin position and the checking-start position are positions in the carriage transporting path determined at a design stage. It is possible to determine the checking-start position with a print-start position or a paper position in a case of carrying out image formation, that is printing, on the paper Q of a standard size with the maximum frequency of usage or the paper Q of the largest standard size which is supplied to the printer apparatus 1, as a base. For example, it is possible to determine a position in the transporting path of the carriage 41 on which, one side of the paper (such as an A4-size paper) along the secondary scanning direction passes, as the checking-start position. Moreover, it is possible to determine a checking-end (testing-end) position with respect to the checking-start position, with a print-end position or a paper position in a case of carrying out image formation (printing) on the paper as a base. For example, it is possible to determine a position in the transporting path of the carriage on which, the other side of the paper (such as an A4-size paper) along the secondary scanning direction passes, as the checking-end position.

As the carriage 41 moves up to the checking-start position, the operation-amount computing unit 170 starts the control of transporting the carriage 41 according to a velocity profile for checking (S330). The velocity profile for checking is a velocity profile for transporting the carriage 41 from the checking-start position up to the checking-end position.

In the control of transporting the carriage 41, the operation-amount computing unit 170 computes (calculates) the operation amount U0 such that the carriage 41 follows the target velocity Vr, based on the target velocity Vr at the current time according to the velocity profile, and the velocity V which has been measured by the encoder-signal processing unit 110. Further, the operation-amount computing unit 170 adds the operation amount U0 and the reactive-force estimated value $\tau 2$ that is input from the second disturbance observer 180, and inputs the operation amount $U=U0+\tau 2$ after correction, to the PWM-signal generating circuit 190. The operation-amount computing unit 170 starts such control of transporting the carriage 41.

Moreover, as the control of transporting starts, the operation-amount computing unit 170 makes a judgment of whether or not the jamming has occurred at the jamming judging unit 60 (step S340) based on the flag F that is input from the jamming judging unit 160. In a case in which, a judgment is not made that the jamming has occurred (F=0) (No at step S340), the operation-amount computing unit 170 makes a judgment of whether or not the carriage 41 has reached the checking-end position (S350). When the operation-amount computing unit 170 makes a judgment that the carriage 41 has not reached the checking-end position (No at step S350), the process shifts to step S330, and continues the control of transporting the carriage 41. Moreover, when the operation-amount computing unit 170 makes a judgment that the carriage 41 has reached the checking-end position (Yes at step S350), it terminates the control of transporting the carriage 41, and terminates the start-up time filter updating processing.

On the other hand, when a judgment is made that the jamming has occurred (Yes at step S340), the operation-amount computing unit 170 executes the processing for stopping the CR motor 51 and the carriage 41 till the carriage 41 stops (S360 and S370). Concretely, by switching the operation amount U which is input to the PWM-signal generating circuit 190 to 0, it is possible to stop the CR motor 51 and the carriage 41.

Moreover, as the carriage 41 stops (Yes at step S370), the operation-amount computing unit 170 updates the frequency characteristics of the first low-pass filter 135 by updating the cut-off frequency $\omega 1$ of the first low-pass filter 135 in a direction of lowering the predetermined amount C, or by updating the order n of the first low-pass filter 135 in a direction of adding 1 (S380).

Thereafter, the operation-amount computing unit 170 carries out control of rearranging the carriage 41 at the checking-start position (S390), and executes once again the processing from step S330 onward. In such manner, in a case in which, the judgment is made that the jamming has occurred, the operation-amount computing unit 170 updates the frequency characteristics (the cut-off frequency $\omega 1$ or the filter order n) of the first low-pass filter 135 in stages till the judgment that the jamming has occurred is ceased to be made. Moreover, when such misjudgment of jamming ceases to exist, the operation-amount computing unit 170 makes an affirmative judgment at step S350, and terminates the start-up time filter updating processing. In other words, with the initial frequency characteristics, the operation-amount computing unit 170 updates the frequency characteristics of the first low-pass filter 135 such that, higher the output of the reactive-force estimated value τ, lower is the cut-off frequency ω1, or the filter order n increases.

The printer apparatus 1 of the second modified embodiment has been described above. Even in the printer apparatus 1 of the second modified embodiment, it is possible to carry out an appropriate updating of the frequency characteristics corresponding to a variation and change with the lapse of time of the mechanical characteristics of the controlled object, for the first low-pass filter 135, and to suppress the misjudgment of jamming, thereby forming a highly reliable printer apparatus 1. Moreover, according to the second modified embodiment, even without checking from the user whether the judgment result is right or wrong, it is possible to update appropriately the frequency characteristics of the first low-pass filter 135, which is convenient for the user.

Other Embodiments

The embodiments of the present teaching including the modified embodiments have been described above. However, the present teaching is not restricted to the embodiments described above, and it is possible to adopt various embodiments. For instance, in the embodiments described above, the printer apparatus 1 in which the operation amount U0 is corrected by the output of the second disturbance observer 180 has been described. However, the second disturbance observer 180 is not indispensable, and may not be provided to the printer apparatus 1. In this case, the operation-amount computing unit 170 inputs the operation amount U0 to the PWM-signal generating circuit 190 as the operation amount U. Moreover, the first low-pass filter 135 which carries out filtering of the differential signal may be another filter having different frequency characteristics, provided that the filter is capable of damping the vibrational component.

Moreover, the application of the present teaching is not restricted to an ink jet printer, and the present invention is also applicable to various sorts of control units which control the movement of an object by a motor, and in which, there is a possibility of occurrence of a defect in the controlled object, such that the controlled object makes a contact with a foreign object. The defect in this case includes defects which are not expected to occur in the controlled object, such as, a defect in detection of the position and the velocity of carriage due to dirt on the encoder scale and a sudden fluctuation or change in a sliding load of the carriage. Moreover, the present invention is applicable not only to a feedback control system but also to a feed-forward control system, and is applicable not only to a velocity-control system but also to a position-control system.

[Correspondence Relationship]

Correspondence relationship of the terminology is as follows. The processing which the operation-amount computing unit 170 executes corresponds to an example of processing realized by computing processing. The processing at steps S120 and S140 corresponds to an example of processing realized by corrected-input processing, and the processing at step S160 corresponds to an example of processing realized by a defect handling means. Moreover, the combination of the CR motor 51 and the carriage transporting mechanism 40 corresponds to an example of an image forming mechanism or a recording-unit transporting mechanism.

Moreover, the encoder 55 and the encoder-signal processing unit 110 correspond to an example of a mechanism which executes measurement processing, the input units 131 and 181 correspond to an example of a mechanism which executes inverse-model input processing, and subtracters 133 and 183 correspond to an example of a mechanism which executes differential-signal generation processing. Moreover, the jamming judging unit 160 corresponds to a mechanism which executes judging processing. Furthermore, the filter updating processing and the start-up time filter updating processing correspond to an example of processing realized by updating processing.

What is claimed is:

1. A control device configured to control a drive system including a motor and a driven object which is driven by the motor, as a controlled object, comprising:

a controller configured to compute an control input which is to be input to the controlled object, to measure a control amount of the controlled object, to input a measurement signal of the controlled amount to an inverse model of a model indicating input-output characteristics of the controlled object, and to generate a differential signal between an output of the inverse model and the control input which is input to the controlled object;

a filter configured to filter the generated differential signal, and having frequency characteristics of damping a vibrational component which is developed due to mechanical characteristics of the controlled object, from the differential signal, wherein the controller is configured to make a judgment of whether or not a defect has occurred in the controlled object, based on an output of the filter; and an updating mechanism configured to update frequency characteristics of the filter.

2. The control device according to claim 1, wherein the filter is a low-pass filter which is configured to damp the vibrational component which is not smaller than a cut-off frequency that has been set, and the updating mechanism is configured to update the cut-off frequency of the low-pass filter.

3. The control device according to claim 2, wherein the controller is configured to make a judgment of whether or not a defect in which the driven object makes a contact with a foreign object has occurred, and the updating mechanism is configured so that the updating mechanism, based on an output of the low-pass filter which has been acquired when no foreign object exists, updates the cut-off frequency such that, higher is the output, lower is the cut-off frequency.

4. The control device according to claim 2, wherein the updating mechanism is configured to update the cut-off frequency in a direction of lowering, under a condition that information indicating that a misjudgment has occurred in the controller has been input.

5. The control device according to claim 1, wherein the filter is a low-pass filter which is configured to damp the vibrational component with an attenuation gradient which has been set, and the updating mechanism is configured to update the attenuation gradient of the low-pass filter.

6. The control device according to claim 5, wherein the controller is configured to make a judgment of whether or not a defect in which the driven object makes a contact with a foreign object has occurred, and the updating mechanism is configured such that, the updating mechanism, based on an output of the low-pass filter that has been acquired when no foreign object exists, updates the attenuation gradient such that, higher is the output, higher is the attenuation gradient.

7. The control device according to claim 5, wherein the updating mechanism is configured to update the attenuation gradient in a direction of becoming higher, under a condition that information indicating that a misjudgment has occurred in the controller has been input.

8. The control device according to claim 1, wherein the controller is configured to compare the output of the filter and a threshold value, and in a case in which the output is higher than the threshold value, the controller makes a judgment that a defect has occurred in the controlled object.

9. The control device according to claim 1, wherein the filter is a low-pass filter which is configured to damp the vibrational component which is not smaller than a cut-off frequency that has been set, and
the control device further comprising:
a first low-pass filter as the low-pass filter; and
a second low-pass filter configured to damp a high-frequency component of the differential signal,
wherein the controller is configured such that, the controller, based on an output of the second low-pass filter, corrects the control input that has been computed, and inputs the control input after the correction to the controlled object, and
the cut-off frequency of the first low-pass filter is lower than a cut-off frequency of the second low-pass filter.

10. The control device according to claim 1, wherein the inverse model is an inverse model when input-output characteristics of the controlled object are indicated by a rigid model.

11. The control device according to claim 1, wherein the controller is configured to stop the driven object, under a condition that a judgment has been made that the defect has occurred.

12. The control device according to claim 1, wherein the controlled object is an image forming mechanism which includes the motor and a recording unit as the driven object that is displaced by being driven by the motor, and which is configured to form an image on a sheet in front thereof, and
the controller is configured to make a judgment of whether or not, a defect in which the recording unit makes a contact with the sheet as the foreign object has occurred.

13. A control device configured to control a drive system including a motor and a driven object which is driven by the motor, as a controlled object, comprising:
a controller configured to compute a control input which is to be input to the controlled object, to measure a control amount of the controlled object, to input a measurement signal of the control amount which has been measured to an inverse model of a model indicating input-output characteristics of the controlled object, and to generate a differential signal between an output of the inverse model and the control input which is input to the controlled object; and
a first low-pass filter and a second low-pass filter configured to attenuate a high-frequency component of the differential signal that has been generated by the controller,
wherein the controller is configured to make a judgment of whether or not a defect has occurred in the controlled object based on an output of the first low-pass filter,
based on an output of the second low-pass filter, the controller is configured to correct the control input which has been computed, and to input a control input after the correction, to the controlled object, and
a cut-off frequency of the first low-pass filter is lower than a cut-off frequency of the second low-pass filter.

14. The control device according to claim 13, further comprising an updating mechanism configured to update frequency characteristics of the first low-pass filter.

15. The control device according to claim 14, wherein the controller is configured to make a judgment of whether or not a defect that the driven object makes a contact with a foreign object has occurred, and
the updating mechanism is configured such that, the updating mechanism, based on the output of the first low-pass filter which has been acquired when no foreign object exists, updates the frequency characteristics such that, higher the output, lower is the cut-off frequency, or higher is the attenuation gradient.

16. The control device according to claim 13, wherein the controller is configured to compare the output of the first low-pass filter and a threshold value, and in a case in which the output is higher than the threshold value, the controller makes a judgment that a defect has occurred in the controlled object.

17. The control device according to claim 13, wherein the inverse model is an inverse model when input-output characteristics of the controlled object are indicated by a rigid model.

18. The control device according to claim 13, wherein the controller is configured to stop the driven object, under a condition that a judgment has been made that the defect has occurred.

19. The control device according to claim 13, wherein the controlled object is an image forming mechanism which includes the motor and a recording unit as the driven object that is displaced by being driven by the motor, and which is configured to form an image on a sheet in front thereof, and
the controller is configured to make a judgment of whether or not, a defect in which the recording unit makes a contact with the sheet as the foreign object has occurred.

20. An image forming system configured to form an image on a sheet that is transported, comprising:
a recording-unit transporting mechanism including a recording unit which is configured to form an image on the sheet and a motor which is configured to drive the recording unit, and configured to be displaced with respect to the sheet by being driven by the motor;
a control device configured to control the recording-unit transporting mechanism as a controlled object, wherein the control device includes a controller and a filter, the controller being configured to compute a control input of the motor, to measure a physical amount indicating a state of movement of the recording unit, as a controlled amount corresponding to the control input, to input a measurement signal of the physical amount that has been measured to an inverse model which is a model indicating input-output characteristics of the controlled object, and to generate a differential signal between an output of the inverse model and the control input which is input to the motor, and the filter being configured to filter the differential signal generated by the controller, and having frequency characteristics of damping a vibrational component which is developed due to mechanical characteristics of the controlled object, from the differential signal, and the controller is configured to make a judgment of whether or not the recording unit has made a contact with the sheet, based on an output of the filter; and
an updating mechanism configured to update frequency characteristics of the filter.

21. An image forming system configured to form an image on a sheet that is transported, comprising:
a recording-unit transporting mechanism including a recording unit which is configured to form an image on the sheet, and a motor configured to drive the recording unit, the recording unit configured to be displaced with respect to the sheet by being driven by the motor; and a control device configured to control the recording-unit transporting mechanism as a controlled object, wherein the control device includes a controller and a first low-pass filter and a second low-pass filter, the controller being configured to compute a control input which is to be input to the controlled object, to measure a physical amount indicating a state of movement of the recording unit, as a control amount corresponding to the control input, to input a measurement signal of the physical amount which has been measured to an inverse model which is a model indicating input-output characteristics of the controlled object, and to generate a differential signal between an output of the inverse model and the control input which is input to the motor, the first low-pass filter and the second low-pass filter being configured to damp a high-frequency component of the differential signal that has been generated, the controller is configured to make a judgment of whether or not the recording unit has made a contact with the sheet based on an output of the first low-pass filter, the controller is configured to correct the control input which has been computed based on an output of the second low-pass filter, and to input an control input after the correction to the motor, and a cut-off frequency of the first low-pass filter is lower than a cut-off frequency of the second low-pass filter.

* * * * *